(12) United States Patent
Zhang et al.

(10) Patent No.: US 11,027,833 B2
(45) Date of Patent: Jun. 8, 2021

(54) AERIAL SYSTEM PROPULSION ASSEMBLY AND METHOD OF USE

(71) Applicant: Hangzhou Zero Zero Technology Co., Ltd., Zhejiang (CN)

(72) Inventors: Lei Zhang, Hangzhou (CN); Hanqing Guo, Hangzhou (CN); Zhaozhe Wang, Hangzhou (CN); Tong Zhang, Hangzhou (CN); Mengqiu Wang, Hangzhou (CN)

(73) Assignee: HANGZHOU ZERO ZERO TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/553,649

(22) Filed: Aug. 28, 2019

(65) Prior Publication Data

US 2019/0382105 A1 Dec. 19, 2019

Related U.S. Application Data

(62) Division of application No. 15/495,615, filed on Apr. 24, 2017, now Pat. No. 10,435,144.

(Continued)

(51) Int. Cl.
| | |
|---|---|
| *B64C 27/32* | (2006.01) |
| *B64C 11/04* | (2006.01) |
| *B64C 11/02* | (2006.01) |
| *B64C 27/08* | (2006.01) |
| *B64C 27/14* | (2006.01) |

(Continued)

(52) U.S. Cl.
CPC .............. *B64C 27/32* (2013.01); *B64C 11/02* (2013.01); *B64C 11/04* (2013.01); *B64C 27/08* (2013.01); *B64C 27/14* (2013.01); *B64C 39/024* (2013.01); *B64C 27/001* (2013.01);

(Continued)

(58) Field of Classification Search
CPC ......... B64C 27/32; B64C 11/02; B64C 11/04; B64C 27/08; B64C 27/14; B64C 27/001; B64C 39/029; B64C 2201/027
See application file for complete search history.

(56) References Cited

U.S. PATENT DOCUMENTS

| | | |
|---|---|---|
| 2,535,527 A | 12/1950 | Barkley |
| 3,083,935 A | 4/1963 | Piasecki |

(Continued)

FOREIGN PATENT DOCUMENTS

| | | |
|---|---|---|
| CH | 333967 A | 11/1958 |
| CN | 101976078 A | 2/2011 |

(Continued)

OTHER PUBLICATIONS

EP15875205.5 Search Report dated Dec. 22, 2017, 7 pages.

(Continued)

*Primary Examiner* — George C Jin

(57) ABSTRACT

An aerial vehicle including a housing, an outrunner motor including a stator mechanically coupled to the housing and a rotor rotationally coupled to the stator, and a propeller removably coupled to the rotor, the propeller including a hub and a plurality of propeller blades. A rotor, a propeller including a hub and a propeller blade, a radial alignment mechanism, a rotational retention mechanism, and an axial retention mechanism.

5 Claims, 18 Drawing Sheets

Related U.S. Application Data

(60) Provisional application No. 62/326,794, filed on Apr. 24, 2016, provisional application No. 62/326,795, filed on Apr. 24, 2016, provisional application No. 62/412,408, filed on Oct. 25, 2016.

(51) Int. Cl.
*B64C 39/02* (2006.01)
*B64C 27/00* (2006.01)

(52) U.S. Cl.
CPC .. *B64C 2027/003* (2013.01); *B64C 2201/024* (2013.01); *B64C 2201/027* (2013.01); *B64C 2201/108* (2013.01)

(56) References Cited

U.S. PATENT DOCUMENTS

| | | |
|---|---|---|
| 4,043,421 A | 8/1977 | Smith |
| 5,351,913 A | 10/1994 | Cycon et al. |
| 5,419,514 A | 5/1995 | Duncan |
| 5,503,351 A | 4/1996 | Vass |
| 5,672,086 A | 9/1997 | Dixon |
| 5,890,441 A | 4/1999 | Swinson et al. |
| 6,234,426 B1 | 5/2001 | Renken et al. |
| 6,260,796 B1 | 7/2001 | Klingensmith |
| 6,270,038 B1 | 8/2001 | Cycon et al. |
| 6,293,491 B1 | 9/2001 | Wobben |
| 6,547,180 B1 | 4/2003 | Cassidy |
| 6,688,936 B2 | 2/2004 | Davis |
| 6,694,228 B2 | 2/2004 | Rios |
| 6,745,977 B1 | 6/2004 | Long et al. |
| 6,773,321 B1 | 8/2004 | Urquiaga |
| 6,824,095 B2 | 11/2004 | Mao |
| 6,840,480 B2 | 1/2005 | Carroll |
| 6,843,447 B2 | 1/2005 | Morgan |
| 6,928,363 B2 | 8/2005 | Sankrithi |
| 7,011,274 B1 | 3/2006 | Hardoin |
| 7,090,164 B2 | 8/2006 | Akaro et al. |
| 7,159,817 B2 | 1/2007 | Vandermey et al. |
| 7,267,300 B2 | 9/2007 | Heath et al. |
| 7,306,186 B2 | 12/2007 | Kusic |
| 7,334,755 B2 | 2/2008 | Svoboda |
| 7,341,223 B2 | 3/2008 | Chu |
| 7,343,232 B2 | 3/2008 | Duggan et al. |
| 7,400,950 B2 | 7/2008 | Reich |
| 7,429,997 B2 | 9/2008 | Givon |
| 7,490,572 B2 | 2/2009 | Grober |
| 7,540,450 B2 | 6/2009 | Brand et al. |
| 7,542,828 B2 | 6/2009 | Steele et al. |
| 7,712,701 B1 | 5/2010 | Ehrmantraut et al. |
| 7,857,254 B2 | 12/2010 | Parks |
| 7,874,513 B1 | 1/2011 | Smith |
| 7,959,104 B2 | 6/2011 | Kuntz |
| 8,052,081 B2 | 11/2011 | Olm et al. |
| 8,111,159 B2 | 2/2012 | Andreasson et al. |
| 8,146,855 B2 | 4/2012 | Ismailov |
| 8,177,159 B2 | 5/2012 | Khakimov et al. |
| 8,215,412 B2 | 7/2012 | Williams et al. |
| 8,275,412 B2 | 9/2012 | Alameh et al. |
| 8,346,480 B2 | 1/2013 | Trepagnier et al. |
| 8,413,123 B2 | 4/2013 | Tanabe et al. |
| 8,430,709 B1 | 4/2013 | Wong |
| 8,453,962 B2 | 6/2013 | Shaw |
| 8,473,123 B2 | 6/2013 | Sun et al. |
| 8,564,148 B1 | 10/2013 | Novak |
| 8,590,829 B2 | 11/2013 | Keidar et al. |
| 8,620,493 B2 | 12/2013 | Hughes et al. |
| 8,695,919 B2 | 4/2014 | Shachor et al. |
| 8,733,690 B2 | 5/2014 | Bevirt et al. |
| 8,774,982 B2 | 7/2014 | Oakley et al. |
| 8,876,039 B2 | 11/2014 | Lubenow et al. |
| 8,903,568 B1 | 12/2014 | Wang et al. |
| 8,907,846 B2 | 12/2014 | Sharawi et al. |
| 8,938,160 B2 | 1/2015 | Wang |
| 8,946,607 B2 | 2/2015 | Gettinger |
| 8,958,928 B2 | 2/2015 | Seydoux et al. |
| 8,991,740 B2 | 3/2015 | Olm et al. |
| 9,004,393 B2 | 4/2015 | Barrett-Gonzales |
| 9,004,396 B1 | 4/2015 | Colin et al. |
| 9,019,115 B2 | 4/2015 | Ballinger |
| 9,051,050 B2 | 6/2015 | Achtelik et al. |
| 9,057,273 B2 | 6/2015 | Wang et al. |
| 9,061,763 B1 | 6/2015 | Christensen et al. |
| 9,079,115 B2 | 7/2015 | Huang et al. |
| 9,085,355 B2 | 7/2015 | Delorean |
| 9,108,729 B2 | 8/2015 | Duggan et al. |
| 9,126,693 B1 | 9/2015 | Shi et al. |
| D741,751 S | 10/2015 | Klaptocz et al. |
| 9,174,732 B2 | 11/2015 | Jensen et al. |
| 9,266,609 B1 | 2/2016 | Kunz |
| D751,025 S | 3/2016 | Howell et al. |
| 9,277,130 B2 | 3/2016 | Wang et al. |
| 9,290,267 B2 | 3/2016 | Metreveli |
| 9,296,270 B2 | 3/2016 | Parks et al. |
| 9,305,317 B2 | 4/2016 | Grokop et al. |
| 9,317,036 B2 | 4/2016 | Wang et al. |
| 9,321,531 B1 | 4/2016 | Takayama et al. |
| 9,346,543 B2 | 5/2016 | Kugelmass |
| 9,346,546 B2 | 5/2016 | Markov |
| 9,364,930 B2 | 6/2016 | Hethcock et al. |
| 9,402,008 B2 | 7/2016 | Chen et al. |
| 9,429,141 B2 | 8/2016 | Vander Lind et al. |
| 9,457,899 B2 | 10/2016 | Duffy et al. |
| 9,493,225 B2 | 11/2016 | Wang et al. |
| 9,493,235 B2 | 11/2016 | Zhou et al. |
| 9,527,597 B1 | 12/2016 | Sada et al. |
| 9,540,105 B2 | 1/2017 | Markov |
| 9,550,567 B1 | 1/2017 | Erdozain et al. |
| 9,567,076 B2 | 2/2017 | Zhang |
| 9,573,683 B2 | 2/2017 | Martin et al. |
| 9,589,595 B2 | 3/2017 | Gao et al. |
| 9,625,907 B2 | 4/2017 | Hu et al. |
| 9,630,710 B2 | 4/2017 | Hutson |
| 9,635,248 B2 | 4/2017 | Yang et al. |
| 9,688,400 B2 | 6/2017 | Hutson |
| 9,696,725 B2 | 7/2017 | Wang |
| 9,703,288 B1 | 7/2017 | Zhang et al. |
| 9,733,644 B2 | 8/2017 | Levien et al. |
| 9,760,072 B2 | 9/2017 | Hall et al. |
| 9,764,829 B1 | 9/2017 | Beckman et al. |
| 9,815,552 B1 | 11/2017 | Welsh |
| 9,828,094 B2 | 11/2017 | McMillion |
| 9,836,053 B2 | 12/2017 | Wang et al. |
| 9,840,339 B1 | 12/2017 | O'Brien et al. |
| 9,842,505 B2 | 12/2017 | Wang et al. |
| 9,856,016 B2 | 1/2018 | Mueller et al. |
| 9,889,930 B2 | 2/2018 | Welsh et al. |
| 9,902,491 B2 | 2/2018 | Chan et al. |
| 9,902,493 B2 | 2/2018 | Simon et al. |
| 9,908,632 B1 | 3/2018 | Kimchi et al. |
| 9,914,538 B2 | 3/2018 | Yu |
| 9,919,797 B2 | 3/2018 | Chan et al. |
| 10,006,360 B2 | 6/2018 | Schmidt |
| 10,124,890 B2 | 11/2018 | Sada-Salinas et al. |
| 10,145,243 B2 | 12/2018 | Ribbens et al. |
| 10,216,197 B2 | 2/2019 | Zhang et al. |
| 10,347,140 B2 | 7/2019 | Kneuper et al. |
| 2002/0142699 A1 | 10/2002 | Davis |
| 2003/0066932 A1 | 4/2003 | Carroll |
| 2003/0192989 A1 | 10/2003 | Owen et al. |
| 2003/0212478 A1 | 11/2003 | Rios |
| 2004/0035347 A1 | 2/2004 | Grober |
| 2004/0059497 A1 | 3/2004 | Sankrithi |
| 2004/0144890 A1 | 7/2004 | Mao |
| 2004/0245374 A1 | 12/2004 | Morgan |
| 2005/0004723 A1 | 1/2005 | Duggan et al. |
| 2005/0178882 A1 | 8/2005 | Akaro et al. |
| 2005/0230520 A1 | 10/2005 | Kusic |
| 2006/0011780 A1 | 1/2006 | Brand et al. |
| 2006/0151666 A1 | 7/2006 | Vandermey et al. |
| 2006/0192046 A1 | 8/2006 | Heath et al. |
| 2006/0266879 A1 | 11/2006 | Svoboda |
| 2006/0284003 A1 | 12/2006 | Chu |

(56) References Cited

U.S. PATENT DOCUMENTS

| | | |
|---|---|---|
| 2007/0023582 A1 | 2/2007 | Steele et al. |
| 2007/0057113 A1 | 3/2007 | Parks |
| 2007/0262195 A1 | 11/2007 | Bulaga et al. |
| 2008/0048065 A1 | 2/2008 | Kuntz |
| 2008/0054121 A1 | 3/2008 | Yoeli |
| 2009/0008499 A1 | 1/2009 | Shaw |
| 2009/0308347 A1 | 12/2009 | Hathaway et al. |
| 2010/0051741 A1 | 3/2010 | Ismailov |
| 2010/0096493 A1 | 4/2010 | Khakimov et al. |
| 2010/0108801 A1 | 5/2010 | Olm et al. |
| 2010/0140416 A1 | 6/2010 | Ghanian et al. |
| 2010/0167783 A1 | 7/2010 | Alameh et al. |
| 2011/0017865 A1 | 1/2011 | Achtelik et al. |
| 2011/0164108 A1 | 7/2011 | Bates et al. |
| 2011/0221692 A1 | 9/2011 | Seydoux et al. |
| 2011/0226892 A1 | 9/2011 | Crowther et al. |
| 2012/0035788 A1 | 2/2012 | Trepagnier et al. |
| 2012/0056040 A1 | 3/2012 | Brotherton-Ratcliffe et al. |
| 2012/0078451 A1 | 3/2012 | Ohtomo et al. |
| 2012/0083945 A1 | 4/2012 | Oakley et al. |
| 2012/0091258 A1 | 4/2012 | Keidar et al. |
| 2012/0097801 A1 | 4/2012 | Barrett |
| 2012/0158215 A1 | 6/2012 | Sun et al. |
| 2012/0177497 A1 | 7/2012 | Huang et al. |
| 2012/0200703 A1 | 8/2012 | Nadir et al. |
| 2012/0248259 A1 | 10/2012 | Page et al. |
| 2012/0267472 A1 | 10/2012 | Pratzovnick et al. |
| 2012/0271461 A1 | 10/2012 | Spata |
| 2012/0280080 A1 | 11/2012 | Lubenow et al. |
| 2013/0134254 A1 | 5/2013 | Moore |
| 2013/0146716 A1 | 6/2013 | Gettinger |
| 2013/0214088 A1 | 8/2013 | Shachor et al. |
| 2013/0297102 A1 | 11/2013 | Hughes et al. |
| 2014/0025229 A1 | 1/2014 | Levien et al. |
| 2014/0025234 A1 | 1/2014 | Levien et al. |
| 2014/0026802 A1 | 1/2014 | Parks et al. |
| 2014/0032034 A1 | 1/2014 | Raptopoulos et al. |
| 2014/0037278 A1 | 2/2014 | Wang |
| 2014/0046589 A1 | 2/2014 | Metzler et al. |
| 2014/0061362 A1 | 3/2014 | Olm et al. |
| 2014/0061376 A1 | 3/2014 | Fisher et al. |
| 2014/0099853 A1 | 4/2014 | Condon et al. |
| 2014/0138477 A1 | 5/2014 | Keennon et al. |
| 2014/0142787 A1 | 5/2014 | Tillotson et al. |
| 2014/0158816 A1 | 6/2014 | Delorean |
| 2014/0218239 A1 | 8/2014 | Sharawi et al. |
| 2014/0246545 A1 | 9/2014 | Markov |
| 2014/0257595 A1 | 9/2014 | Tillmann |
| 2014/0259628 A1 | 9/2014 | Hethcock et al. |
| 2014/0313345 A1 | 10/2014 | Conard et al. |
| 2014/0314565 A1 | 10/2014 | Ghapgharan et al. |
| 2014/0316616 A1 | 10/2014 | Kugelmass |
| 2014/0324253 A1 | 10/2014 | Duggan et al. |
| 2014/0374532 A1 | 12/2014 | Duffy et al. |
| 2014/0376170 A1 | 12/2014 | Richard et al. |
| 2015/0097950 A1 | 4/2015 | Wang et al. |
| 2015/0120336 A1 | 4/2015 | Grokop et al. |
| 2015/0122950 A1 | 5/2015 | Markov |
| 2015/0129711 A1 | 5/2015 | Caubel |
| 2015/0160658 A1 | 6/2015 | Reedman et al. |
| 2015/0167492 A1 | 6/2015 | Collette et al. |
| 2015/0179219 A1 | 6/2015 | Gao et al. |
| 2015/0183512 A1 | 7/2015 | Jensen et al. |
| 2015/0184637 A1 | 7/2015 | Vander Lind et al. |
| 2015/0205301 A1 | 7/2015 | Gilmore et al. |
| 2015/0212391 A1 | 7/2015 | Waibel et al. |
| 2015/0226575 A1 | 8/2015 | Rambo |
| 2015/0254988 A1 | 9/2015 | Wang et al. |
| 2015/0266570 A1 | 9/2015 | Metreveli |
| 2015/0274294 A1 | 10/2015 | Dahlstrom |
| 2015/0274309 A1 | 10/2015 | Shi et al. |
| 2015/0321755 A1 | 11/2015 | Martin et al. |
| 2016/0016652 A1 | 1/2016 | Barrett et al. |
| 2016/0023755 A1 | 1/2016 | Elshafei et al. |
| 2016/0041628 A1 | 2/2016 | Verma |
| 2016/0046373 A1 | 2/2016 | Kugelmass |
| 2016/0070264 A1 | 3/2016 | Hu et al. |
| 2016/0070265 A1 | 3/2016 | Liu et al. |
| 2016/0080598 A1 | 3/2016 | Chen et al. |
| 2016/0086497 A1 | 3/2016 | Williams et al. |
| 2016/0093225 A1 | 3/2016 | Williams et al. |
| 2016/0101856 A1 | 4/2016 | Kohstall |
| 2016/0107751 A1 | 4/2016 | D'Andrea et al. |
| 2016/0114887 A1 | 4/2016 | Zhou et al. |
| 2016/0122015 A1 | 5/2016 | Hutson |
| 2016/0122038 A1 | 5/2016 | Fleischman et al. |
| 2016/0144954 A1 | 5/2016 | Daigle |
| 2016/0152316 A1 | 6/2016 | Wang et al. |
| 2016/0152327 A1 | 6/2016 | Bertels |
| 2016/0163203 A1 | 6/2016 | Wang et al. |
| 2016/0171896 A1 | 6/2016 | Buchmueller et al. |
| 2016/0176520 A1 | 6/2016 | Goldstein |
| 2016/0191793 A1 | 6/2016 | Yang et al. |
| 2016/0200415 A1 | 7/2016 | Cooper |
| 2016/0207368 A1 | 7/2016 | Gaonjur |
| 2016/0221671 A1 | 8/2016 | Fisher et al. |
| 2016/0221683 A1 | 8/2016 | Roberts et al. |
| 2016/0229530 A1 | 8/2016 | Welsh et al. |
| 2016/0229533 A1 | 8/2016 | Van Cruyningen |
| 2016/0229534 A1 | 8/2016 | Hutson |
| 2016/0280369 A1 | 9/2016 | Pounds |
| 2016/0283774 A1 | 9/2016 | Buchanan et al. |
| 2016/0286128 A1 | 9/2016 | Zhou |
| 2016/0313742 A1 | 10/2016 | Wang |
| 2016/0327956 A1 | 11/2016 | Zhang et al. |
| 2016/0340035 A1 | 11/2016 | Duru |
| 2016/0378105 A1 | 12/2016 | Tanigawa |
| 2016/0378108 A1 | 12/2016 | Paczan et al. |
| 2017/0010623 A1 | 1/2017 | Tang et al. |
| 2017/0011333 A1 | 1/2017 | Greiner et al. |
| 2017/0023947 A1 | 1/2017 | McMillion |
| 2017/0039859 A1 | 2/2017 | Hu et al. |
| 2017/0057630 A1 | 3/2017 | Schwaiger |
| 2017/0057650 A1 | 3/2017 | Walter-Robinson |
| 2017/0073070 A1 | 3/2017 | Xing |
| 2017/0129603 A1 | 5/2017 | Raptopoulos et al. |
| 2017/0144753 A1 | 5/2017 | Yu |
| 2017/0144757 A1 | 5/2017 | Hall et al. |
| 2017/0152035 A1 | 6/2017 | Zhao et al. |
| 2017/0152060 A1 | 6/2017 | Morisawa |
| 2017/0166304 A1 | 6/2017 | Erdozain et al. |
| 2017/0185084 A1 | 6/2017 | Wang et al. |
| 2017/0217585 A1 | 8/2017 | Hulsman et al. |
| 2017/0225783 A1 | 8/2017 | Fisher et al. |
| 2017/0291697 A1 | 10/2017 | Kornatowski et al. |
| 2017/0291704 A1 | 10/2017 | Alegria |
| 2017/0297707 A1 | 10/2017 | Rollefstad et al. |
| 2017/0313418 A1 | 11/2017 | Yoon |
| 2017/0322563 A1 | 11/2017 | Kohstall |
| 2017/0349264 A1 | 12/2017 | Nilson et al. |
| 2017/0359106 A1 | 12/2017 | John Wilson et al. |
| 2018/0029703 A1 | 2/2018 | Simon et al. |
| 2018/0081363 A1 | 3/2018 | Qu et al. |
| 2018/0099745 A1 | 4/2018 | Welsh et al. |
| 2018/0141650 A1 | 5/2018 | Hampton et al. |
| 2018/0141672 A1 | 5/2018 | Bevirt et al. |
| 2018/0155018 A1 | 6/2018 | Kovac et al. |
| 2018/0194463 A1 | 7/2018 | Hasinski et al. |
| 2018/0208301 A1 | 7/2018 | Ye |
| 2018/0210465 A1 | 7/2018 | Qu et al. |
| 2018/0262674 A1 | 9/2018 | Iwakura et al. |
| 2019/0210719 A1 | 7/2019 | Goldstein et al. |
| 2019/0250601 A1 | 8/2019 | Donahoe et al. |

FOREIGN PATENT DOCUMENTS

| | | | |
|---|---|---|---|
| CN | 102273083 A | 12/2011 | |
| CN | 102511162 A | 6/2012 | |
| CN | 104197928 A | 12/2014 | |
| CN | 104253887 A | 12/2014 | |
| CN | 104486543 A | 4/2015 | |
| CN | 104679013 A | 6/2015 | |
| CN | 104684805 A | 6/2015 | |
| CN | 104684805 A * | 6/2015 | ............ B64C 27/14 |

(56) References Cited

FOREIGN PATENT DOCUMENTS

| | | | |
|---|---|---|---|
| CN | 104685436 A | 6/2015 |
| CN | 204406209 U | 6/2015 |
| CN | 104743104 A | 7/2015 |
| CN | 204507263 U | 7/2015 |
| CN | 104991561 A | 10/2015 |
| CN | 105035318 A | 11/2015 |
| CN | 105116909 A | 12/2015 |
| CN | 105173072 A | 12/2015 |
| CN | 105182986 A | 12/2015 |
| CN | 204822682 U | 12/2015 |
| CN | 105352505 A | 2/2016 |
| CN | 105425952 A | 3/2016 |
| CN | 105836120 A | 8/2016 |
| CN | 106022274 A | 10/2016 |
| CN | 106204443 A | 12/2016 |
| CN | 106335635 A | 1/2017 |
| EP | 1901153 A1 | 3/2008 |
| EP | 2731271 A1 | 5/2014 |
| TW | 201226234 A | 7/2012 |
| WO | 2006112578 A1 | 10/2006 |
| WO | 2009054937 A2 | 4/2009 |
| WO | 2013066475 A3 | 6/2013 |
| WO | 2014003698 A1 | 1/2014 |
| WO | 2015085598 A1 | 6/2015 |
| WO | 2016065623 A1 | 5/2016 |
| WO | 2016080598 A1 | 5/2016 |
| WO | 2016101227 A1 | 6/2016 |
| WO | 2016106715 A1 | 7/2016 |
| WO | 2016107528 A1 | 7/2016 |
| WO | 2016112124 A2 | 7/2016 |

OTHER PUBLICATIONS

International Search Report for PCT Application No. PCT/IB2018/000174 dated Jun. 27, 2018.
International Search Report for PCT Application No. PCT/IB2017/001507 dated Apr. 3, 2018.
International Search Report for PCT Application No. PCT/IB2018/000076 dated May 25, 2018.
International Search Report and Written Opinion for PCT Application No. PCT/IB2017/00704 dated Dec. 7, 2017.

* cited by examiner

AERIAL SYSTEM PROPULSION ASSEMBLY AND METHOD OF USE

CROSS-REFERENCE TO RELATED APPLICATIONS

This application is a divisional of U.S. patent application Ser. No. 15/495,615, filed 24 Apr. 2017, which claims the benefit of U.S. Provisional Application Ser. No. 62/326,794, filed on 24 Apr. 2016, U.S. Provisional Application Ser. No. 62/326,795, filed on 24 Apr. 2016, and U.S. Provisional Application Ser. No. 62/412,408, filed on 25 Oct. 2016, all of which are incorporated in their entirety by this reference.

TECHNICAL FIELD

This invention relates generally to the aerial system field, and more specifically to a new and useful aerial system propulsion assembly and method of use.

BACKGROUND

Aerial system propellers can be awkward and/or difficult to install and remove, and typical propellers often operate with poor aerodynamic performance. Thus, there is a need in the aerial system field to create an improved aerial system propulsion assembly and method for use.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
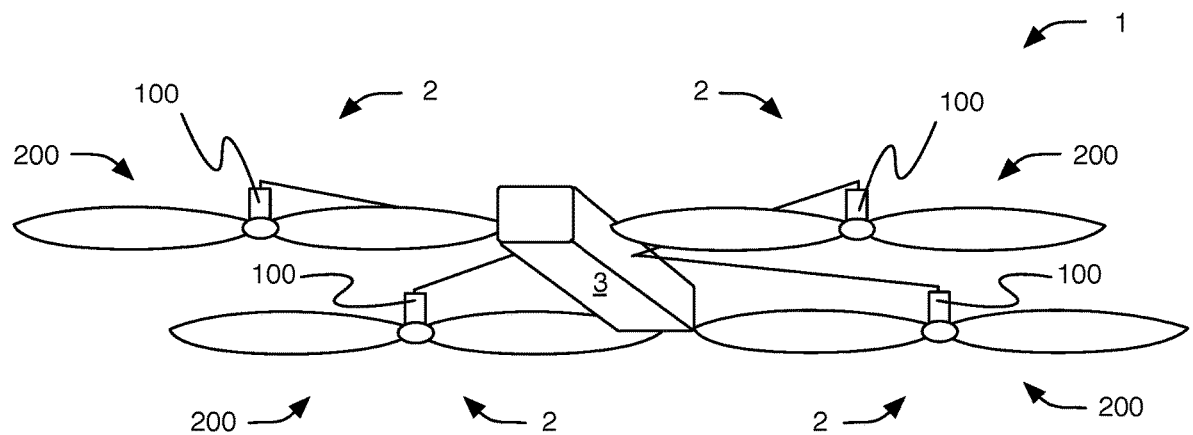
FIG. 1A is a perspective view of an embodiment of the system.
Figure 1B:
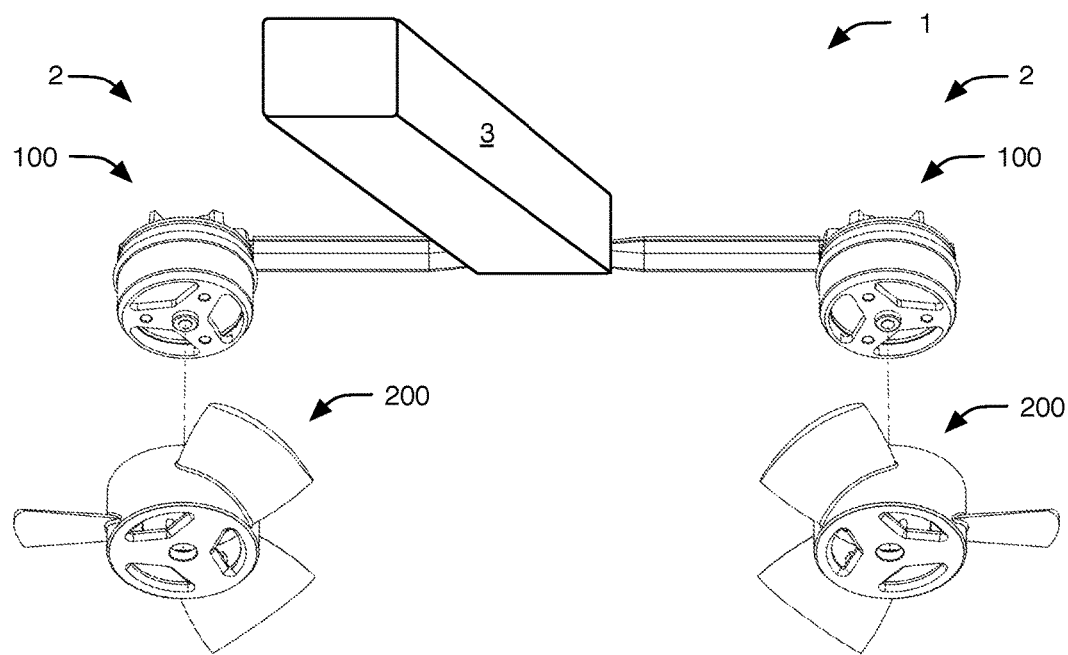
FIG. 1B is a partial perspective view of a variation of the embodiment.

As shown in FIGS. 1A-1B, the aerial system 1 preferably includes a housing 3 and one or more propulsion assemblies 2 (e.g., as described in U.S. application Ser. No. 15/349,749, filed on 11 Nov. 2016, which is incorporated in its entirety by this reference). However, the aerial system 1 can additionally or alternatively include any other suitable elements.

Figure 2:
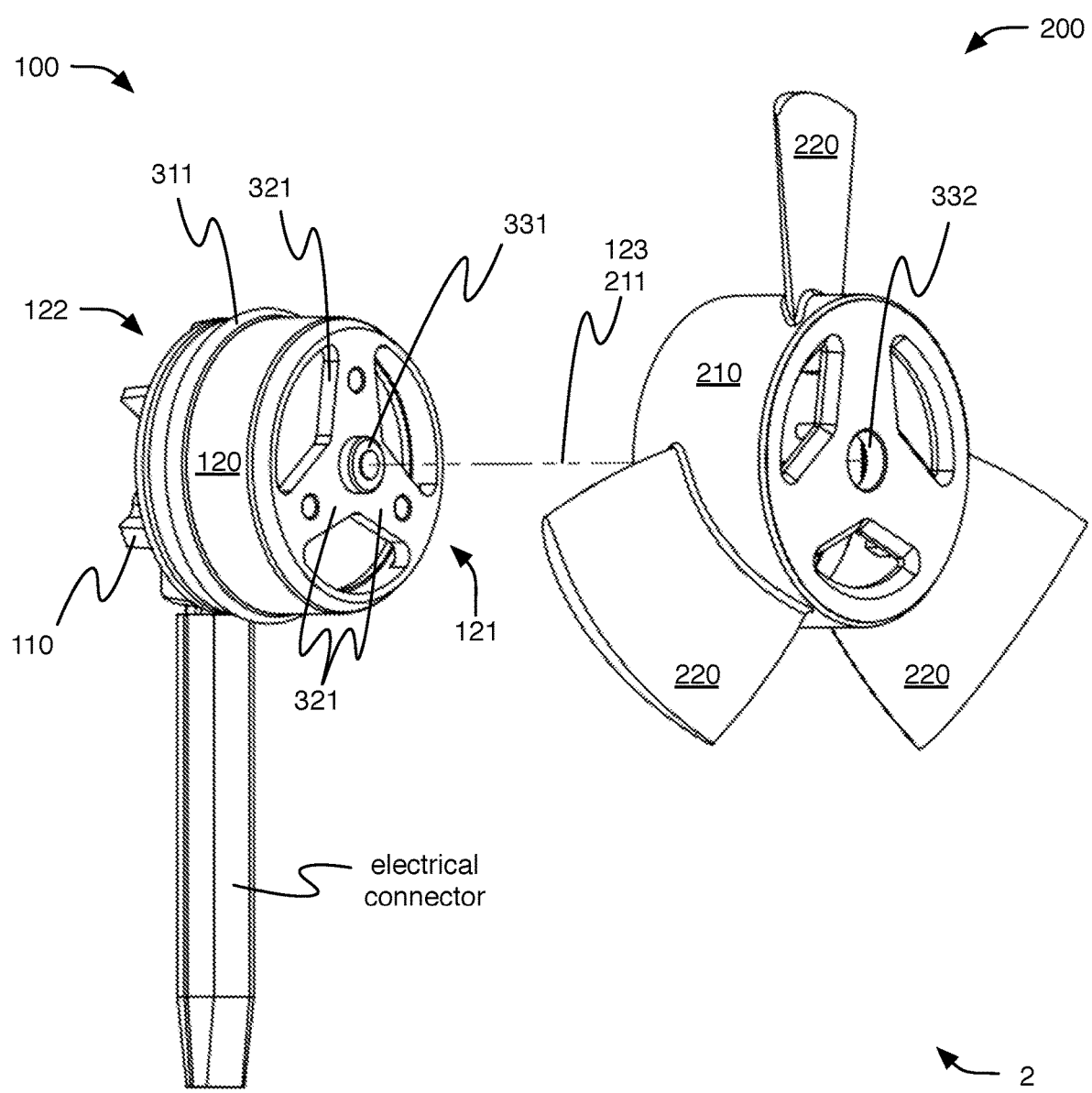
FIG. 2 is a perspective view of a first example of a propulsion assembly, in an unmated configuration.
Figure 15:
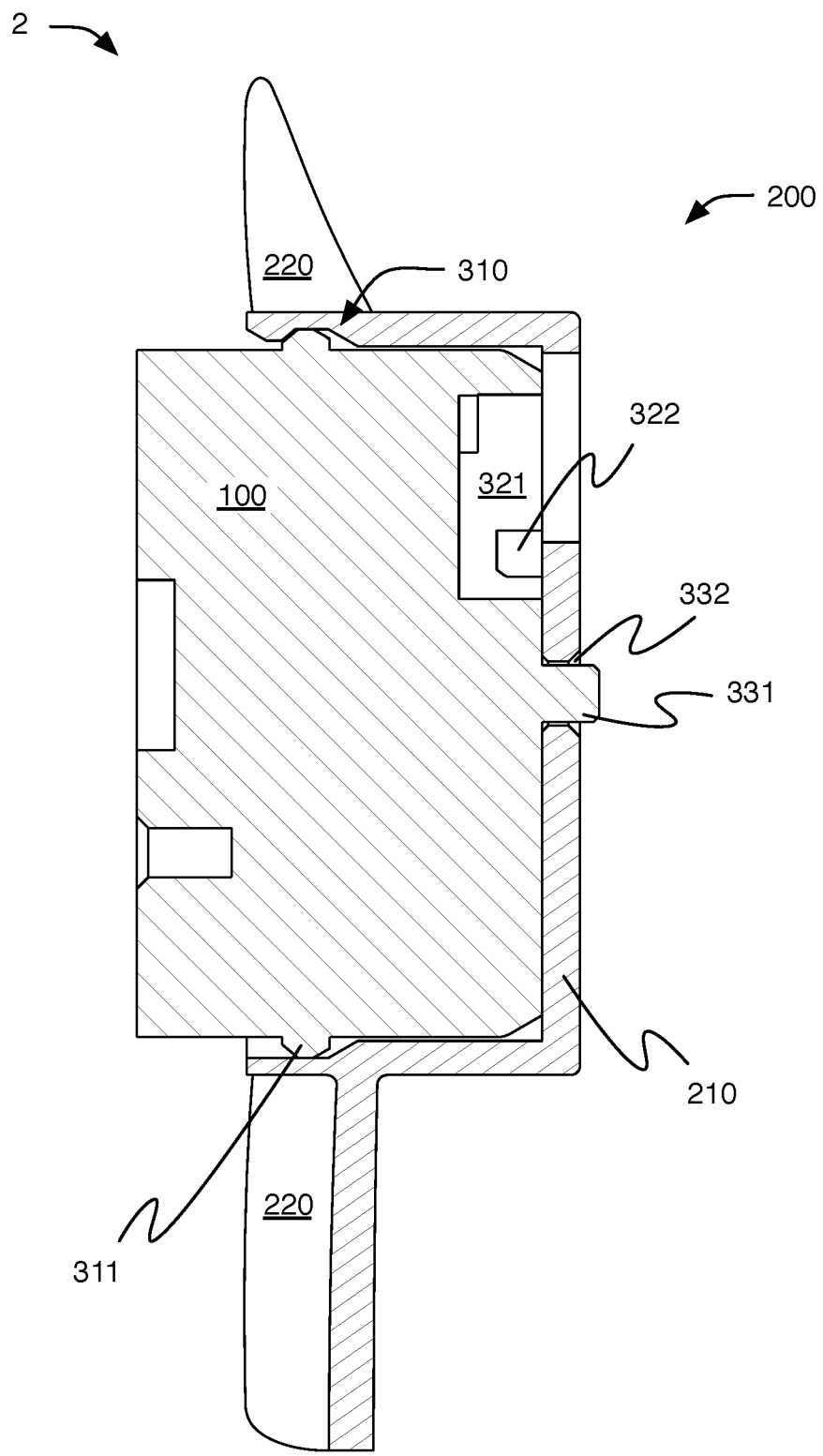
FIG. 15 is a cross-sectional view of a second example of a propulsion assembly, in the mated configuration.

Each propulsion assembly 2 is preferably a motorized propeller assembly (e.g., the rotor described in U.S. application Ser. No. 15/349,749, filed on 11 Nov. 2016, which is incorporated in its entirety by this reference). As shown in FIGS. 2 and 15, the propulsion assembly 2 preferably includes a motor 100, a propeller 200, and one or more mating mechanisms. However, the propulsion assembly 2 can additionally or alternatively include any other suitable elements.

2. Benefits.

The aerial system 1 and method 400 can confer several benefits over conventional aerial systems 1 and methods of use. First, the propulsion assembly 2 can enable facile installation and removal of the propeller 200 using few tools or no tools (e.g., manual removal). The propulsion assembly 2 can be configured to provide feedback (e.g., haptic feedback, acoustic feedback such as clicking, etc.) during the propeller installation process (e.g., mating the propeller 200 to the motor 100) and/or removal process (e.g., unmating the propeller 200 from the motor 100), which can function to aid performance of the method 400 (e.g., by providing confirmation of correct installation and/or removal). The propulsion assembly 2 can aid propeller installation by including alignment features (e.g., elements of the mating mechanisms), which can help achieve and/or maintain alignment between the motor 100 and propeller 200 during installation. Additionally or alternatively, the propulsion assembly 2 can enable facile propeller installation by being radially symmetric (or including elements with radial symmetry, such as elements of the mating mechanisms), which can allow propeller installation in a plurality of rotational alignments.

Second, during aerial system flight (and/or during other propulsion assembly operation), the force generated by the propeller 200 (e.g., reaction force caused by air displaced by the propeller 200) can help retain the propulsion assembly 2 in a mated configuration (e.g., keep the propeller 200 mated to the motor 100). This retention force can function to counteract forces that otherwise might cause the propeller 200 to become unmated from the motor 100 (e.g., centrifugal forces experienced during flight maneuvers). For example, the propeller 200 can be arranged below (e.g., relative to a typical aerial system orientation, relative to a gravity vector, etc.) the motor 100, and can be mated to the motor 100 by an upward force and unmated by a downward force. In this example, when the propulsion assembly 2 is operated (e.g., to provide propulsion to maintain an aerial system hover or otherwise counteract gravitational forces, to perform flight maneuvers, etc.), the propeller 200 is retained against the motor 100 by a force substantially opposing the unmating force direction (and substantially aligned with the mating force direction).

Third, the propulsion assembly 2 can be compatible with a plurality of mating mechanisms, which can enable additional versatility. For example, the system can include a first propeller 200 configured to mate with the motor 100 using snap-fit mating mechanisms and a second propeller 200 configured to mate with the motor 100 using screw-based mating mechanisms. In this example, the first and second propellers can be easily swapped into and out of the system, despite their use of different mating mechanisms.

Fourth, the propeller 200 can operate with good aerodynamic performance and/or generate little noise during operation. This benefit can be enabled by the design of the propeller blades 220. For example, the propeller 200 can include blades 220 defining airfoils with large camber, small thickness, high lift coefficient, and/or high lift-to-drag ratio under low Reynolds number conditions. However, the aerial system 1 and method 400 can additionally or alternatively confer any other suitable benefits.

3. Aerial System.
3.1 Motor.

The motor 100 preferably functions to drive and/or control rotation of the propeller 200 and to mount the propeller 200 to the aerial system housing 3. The motor 100 preferably includes a stator 110 and a rotor 120, and can additionally or alternatively include any other suitable elements.

The motor 100 preferably has a low profile (e.g., to facilitate attachment to and/or containment within the aerial system housing). The motor 100 preferably has a high torque output, which can enable the motor 100 to directly drive the propeller 200 (e.g., without intervening gearing) in some embodiments; however, the motor 100 can have a low torque output, variable torque output, or any other suitable set of output parameters. The motor 100 is preferably a DC electric motor, more preferably a brushless DC electric motor, but can additionally or alternatively be powered by AC electricity, by internal combustion, and/or in any other suitable manner. The motor 100 is preferably an outrunner motor, but can alternatively be a inrunner motor, ferrite motor, and/or any other suitable motor. The motor 100 preferably includes an electrical connector (e.g., connected to the stator 110), which can function to provide power to the motor 100 and/or to control motor operation. However, the motor can be otherwise powered and/or controlled.

The stator 110 can be mechanically coupled to the aerial system 1. The stator 110 is preferably mechanically coupled to the aerial system housing, more preferably connected to and/or fixed with respect to the housing or a portion of the housing (e.g., by one or more mechanical fasteners). The stator 110 is preferably mounted to the housing from above (e.g., relative to a typical aerial system orientation, relative to a gravity vector, etc.), such as by mounting an upper portion of the stator no to an upper portion of the housing (e.g., in systems in which the housing surrounds the propulsion assembly 2), which can enable mounting the propeller 200 to the stator no from below. However, the stator 110 can include any other suitable elements, and can be arranged in any other suitable manner.

Figure 4A:
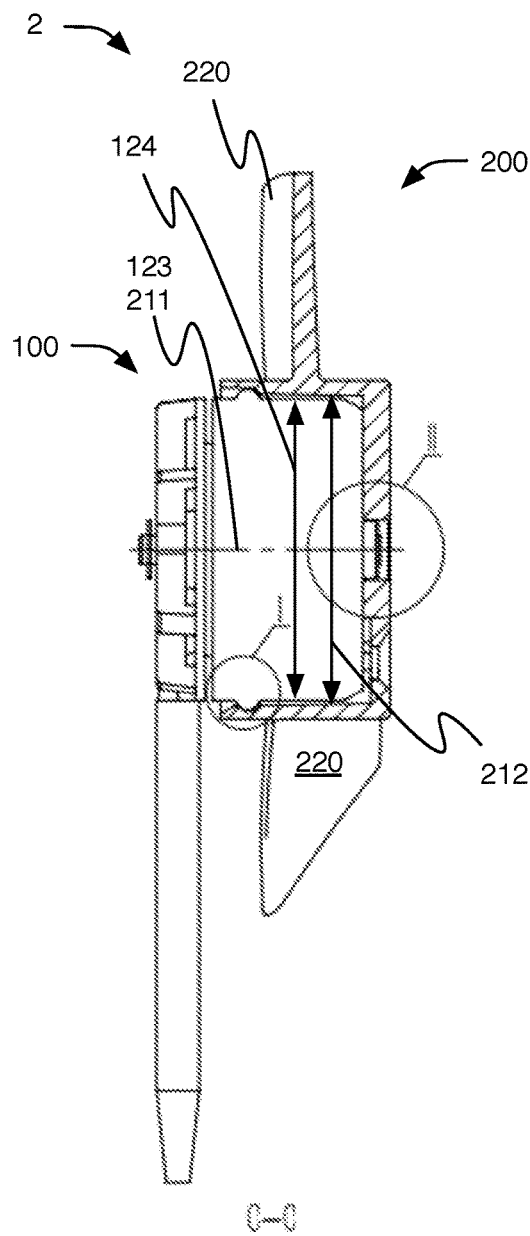
FIG. 4A is a cross-sectional view taken along the line C-C in FIG. 3.
Figure 7A:
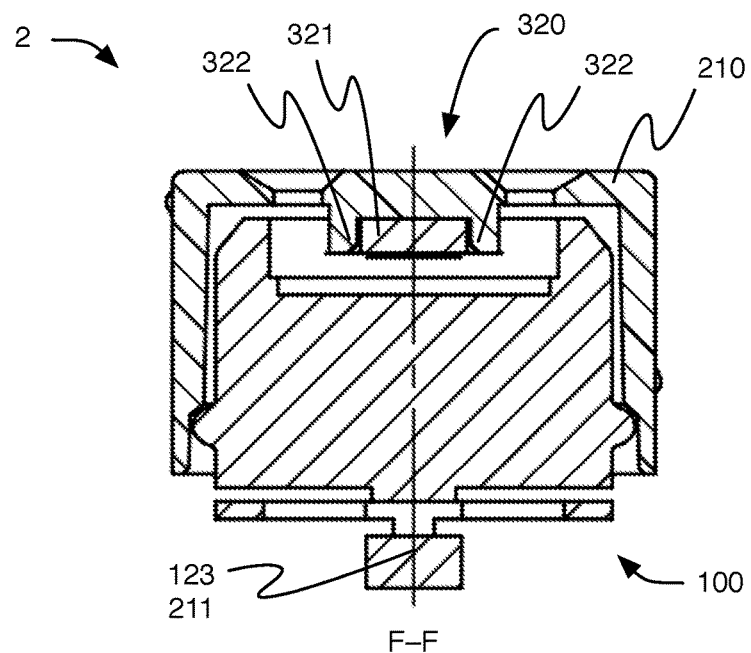
FIG. 7A is a cross-sectional view taken along the line F-F in FIG. 3.

The rotor 120 is preferably rotationally coupled to the stator 110 about a rotor axis 123. The rotor 120 can define a rotor body (e.g., a rotor body defining and/or including a cylindrical body or body segment; polygonal prismatic body or body segment, such as one defining a regular polygonal cross-section; rounded body such as a spherical, spheroidal, or hemispherical body; etc.). The rotor body preferably extends along an axis (e.g., cylindrical body axis), more preferably the rotor axis 123, and can define a first end 121, a second end 122 (e.g., opposing the first end 121), and/or a rotor width such as a rotor diameter 124 (e.g., as shown in FIGS. 4A and 7A).

However, the motor 100 can additionally or alternatively include any other suitable elements in any suitable arrangement.

3.2 Propeller.

Figure 3:
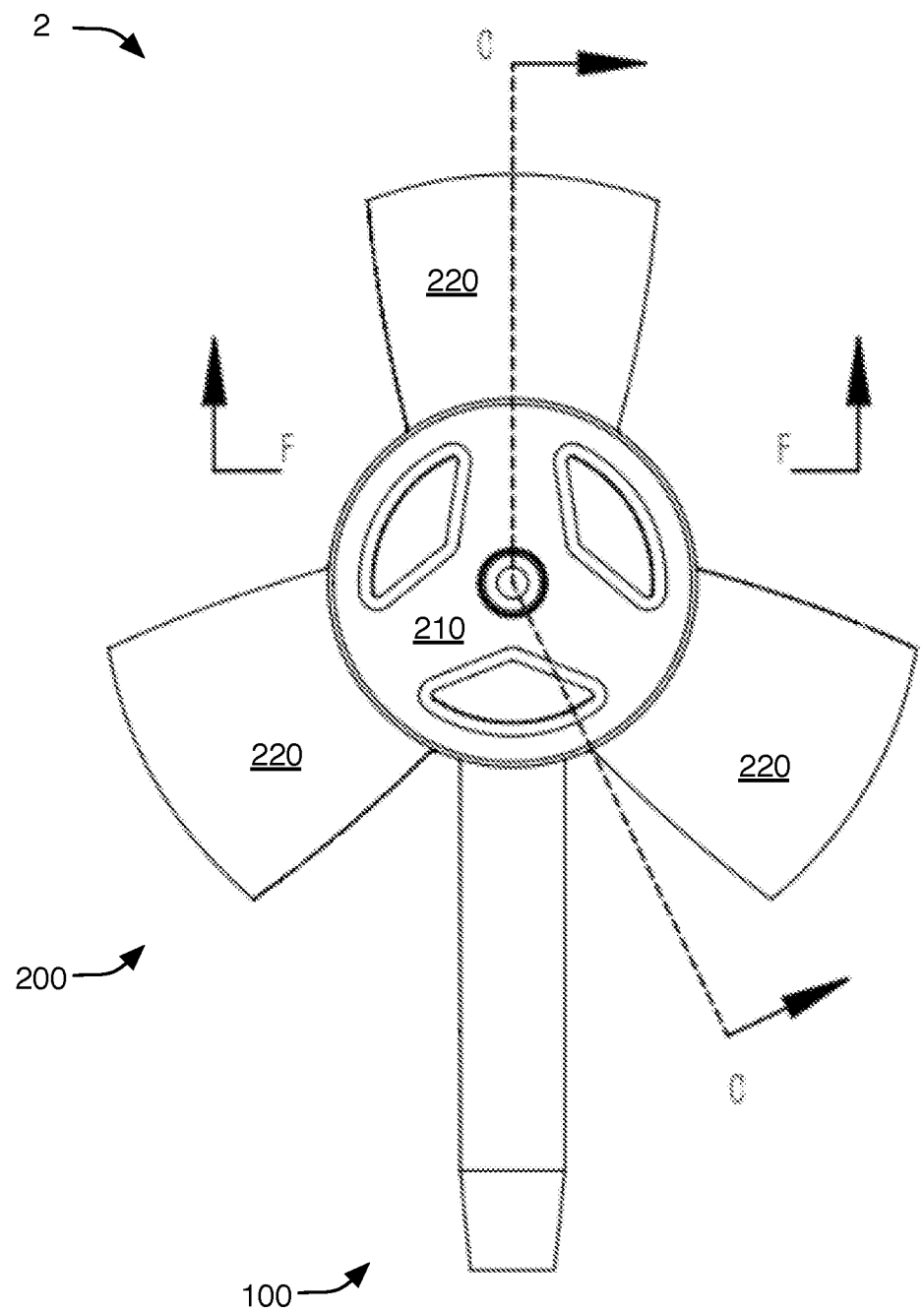
FIG. 3 is a plan view of the first example, in a mated configuration.
Figure 10A:
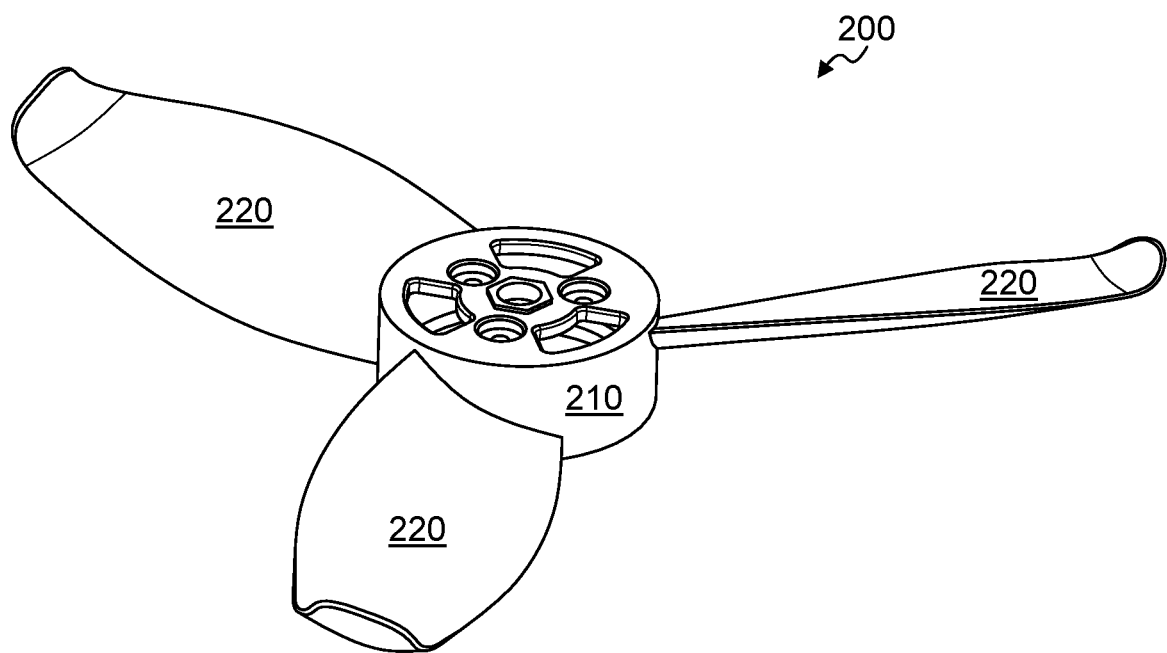
FIG. 10A is a perspective view of a propeller of a fourth example of the propulsion assembly.

The propeller 200 can function to propel the aerial system 1 and/or control aerial system flight. The propeller 200 preferably includes a hub 210 and one or more blades 220, and can additionally or alternatively include any other suitable elements (e.g., as shown in FIGS. 3 and 10A).

3.2.1 Hub.

The hub 210 can define a hub body (e.g., a hub body defining and/or including a cylindrical body or body segment; polygonal prismatic body or body segment, such as one defining a regular polygonal cross-section; rounded body such as a spherical, spheroidal, or hemispherical body; etc.). The hub body preferably extends along an axis (e.g., cylindrical body axis), such as a hub axis 211. The hub body preferably defines a void (e.g., cylindrical void; void complementary to the rotor body, such that the rotor body can be inserted into the void; etc.). The void can define a void width such as a hub inner diameter 212.

The hub 210 is preferably configured to mate with the rotor 120 (e.g., removably, permanently, etc.). In a first embodiment, one of the rotor 120 and hub 210 (inner element) is configured to insert into the other (outer element). In this embodiment, a gap is preferably defined between the rotor 120 and hub 210. The gap can function to decrease vibration transfer and/or amplification between the motor 100 and propeller 200 (e.g., thereby reducing audible noise generated during propulsion assembly operation). For example, a diameter (e.g., largest diameter) of the inner element can be less than an inner diameter of the outer element, and the gap can be defined by the difference in diameters. The gap can be greater and/or less than a threshold value, such as an absolute distance (e.g., 10 mm, 5 mm, 2 mm, 1 mm, 0.5 mm, 0.2 mm, 0.1 mm, etc.), a relative distance (e.g., a percentage of a rotor and/or hub diameter, such as 0.1%, 0.2%, 0.5%, 1%, 2%, 5%, 10%, etc.), and/or any other suitable value.

Figure 4B:
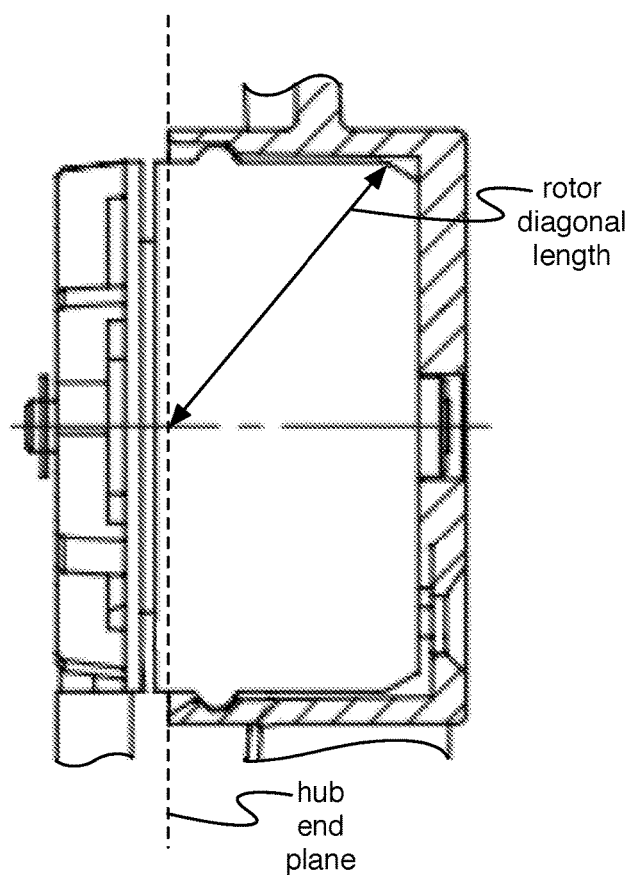
FIG. 4B is a detailed view of a region of FIG. 4A.

In this embodiment, the outer element preferably does not detach from the inner element in response to an applied torque (e.g., about an axis perpendicular to the rotor axis 123 and/or hub axis 211). Preferably, the inner element restricts removal of the outer element along directions that are not substantially aligned with the inner element axis. For example, the outer element can define an outer element end plane normal the outer element axis, the outer element end plane and inner element axis can define an intersection point, and a distance from the intersection point to a region of the inner element within the outer element can be greater than half the outer element inner diameter (e.g., such that the region of the inner element interferes with the outer element during removal along a direction that is not substantially aligned with the inner element axis). In a specific example (e.g., as shown in FIG. 4B), the inner diameter of the outer element can be less than twice an inner element diagonal length (e.g., distance from the intersection point to an external region of the inner element within the outer element).

In a first variation of this embodiment, the rotor 120 is the inner element and the hub 210 is the outer element. In this variation, the rotor 120 is configured to be inserted into the hub 210 (e.g., rotor body insertable into a void defined by the hub 210), and the rotor diameter 124 is less than a hub inner diameter 212 to accommodate such insertion (e.g., wherein the gap is defined by the difference between the diameters). In this variation, the rotor 120 is preferably inserted into the hub void (e.g., into an opening of the void at a hub end, such as one defining a hub end plane normal to the hub axis 211) beginning with the first end 121 (e.g., wherein the second end 122 is inserted following the first end 121, wherein the second end 122 remains outside the void, etc.). In a second variation, the rotor 120 is the outer element and the hub 210 is the inner element. In this variation, the hub 210 is configured to be inserted into the rotor 120 (e.g., into a void defined by the rotor 120), and a hub outer diameter is less than a rotor inner diameter (e.g., defined by the void).

However, the rotor 120 can additionally or alternatively abut the hub 210, interdigitate with the hub 210, and/or be otherwise coupled (e.g., attached) to the hub 210 (e.g., by one or more elements of the mating mechanisms, such as an axial retention mechanism 310).

3.2.2 Blades.

The blades 220 are preferably statically connected to the hub 210, but can additionally or alternatively be coupled to the hub 210 in any other suitable manner. The blades 220 can be arranged radially outward of the hub axis 211. The blades 220 preferably each radiate out from the hub 210, but alternatively the hub can surround the blades 220 (e.g., surround circumferentially), can be coupled to the blades 220 along their length (e.g., wherein the hub 210 defines ribs between the blades 220), and/or have any other suitable arrangement.

Figure 11:
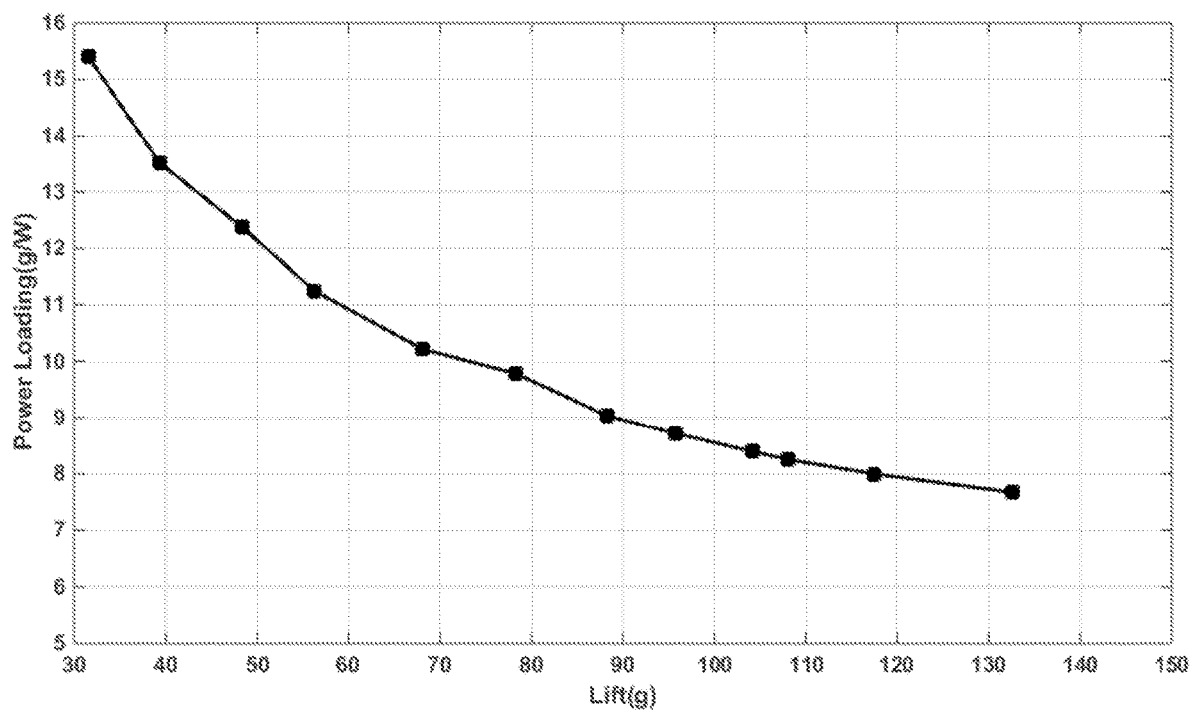
FIG. 11 depicts the power loading curve of a specific example of the propeller during aerial system hovering.

In a first embodiment, the propeller 200 can operate with high efficiency and/or at a low Reynolds number. In this embodiment, the propeller 200 preferably enables low power consumption for aerial system flight (e.g., in low altitude rotary wing drone applications). The propeller 200 can include a plurality of blades 220, with evenly or unevenly distributed angle separation between blades (e.g., about the hub axis 211). The blades 220 can optionally include one or more proplets (e.g., upward, downward, bi-directional, etc.), preferably arranged at or near the blade tip. The proplets preferably define a proplet height of 2%-6% of the propeller blade radius (e.g., distance from the hub cylinder axis to the outer propeller blade end). The propeller 200 of this embodiment typically works under $6.0 \times 10^3$-$1.0 \times 10^5$ Re flow condition, with power loading typically greater than 8 g/W (e.g., as shown in FIG. 11) and/or figure of merit typically above 65%. The blades 220 can optionally define a symmetric profile along some or all of a propeller blade central axis (e.g., within 20%-80% of the distance along the length of the blade 220).

Figure 12A:
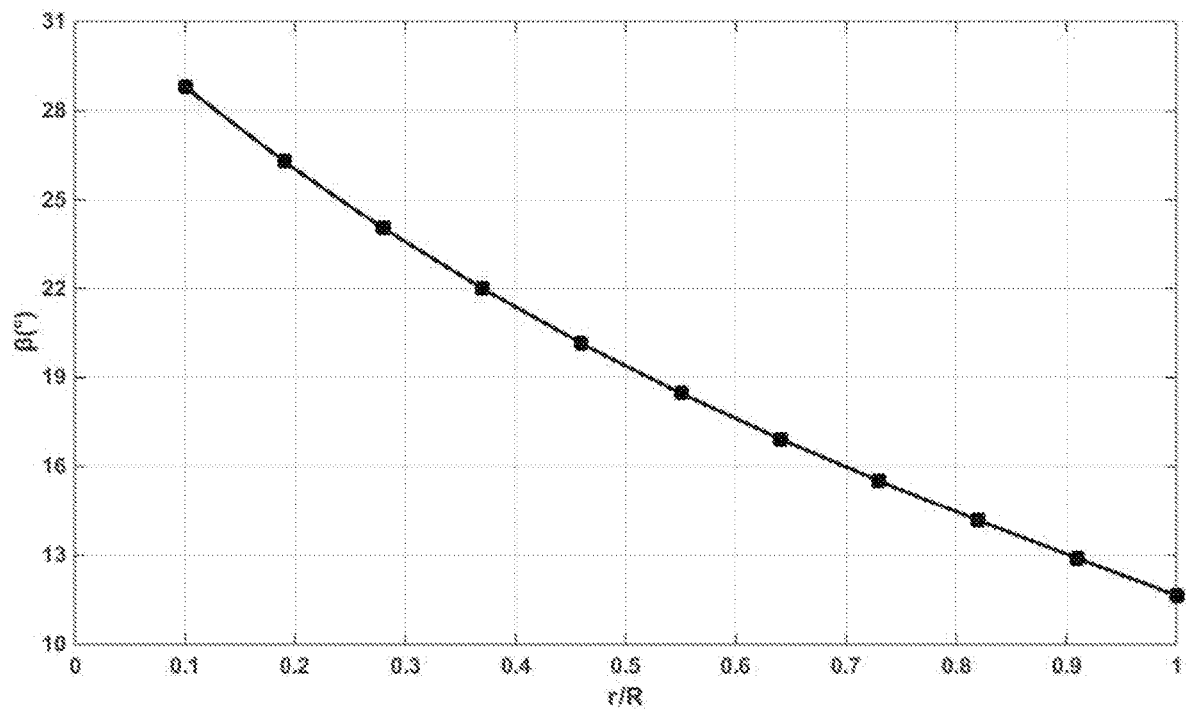
FIGS. 12A and 12B depict the twist angle and chord length, respectively, along the length of the specific example of the propeller.
Figure 12B:
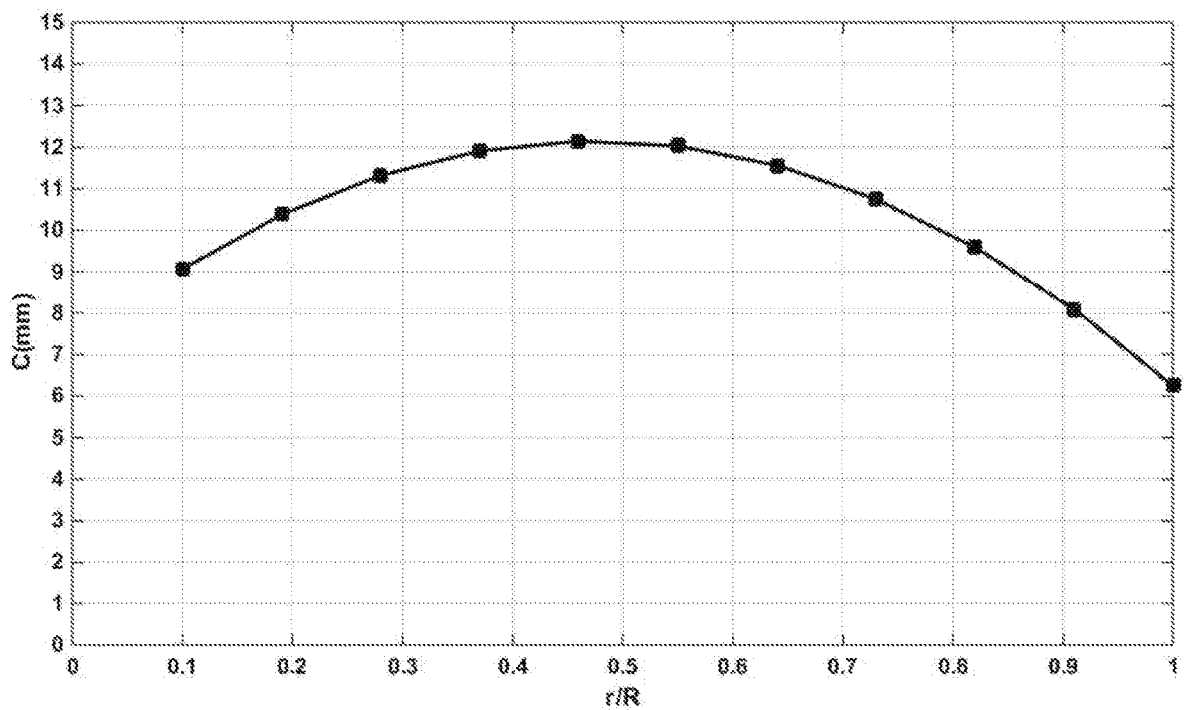

In this embodiment, for one or more points on the propeller blade central axis (e.g., for each point on the axis between an inner and outer propeller blade end), one or more of the blades 220 preferably define a chord on a propeller blade cross-section including the point, the chord defining a normalized chord length $C_r$ substantially defined by the equation:

$$C_r = a_1 \times \left(1 - \frac{r}{R}\right)^3 + 3 \times a_2 \times \left(\frac{r}{R}\right) * \left(1 - \frac{r}{R}\right)^2 + 3 \times a_3 \times \left(\frac{r}{R}\right)^2 \times \left(1 - \frac{r}{R}\right) + a_4 \times \left(\frac{r}{R}\right)^3$$

and/or defining a twist angle $\beta_r$ (e.g., angle between the chord and a reference plane such as a plane normal the hub axis 211) substantially defined by the following equation:

$$\beta_r = b_1 \times \left(1 - \frac{r}{R}\right)^3 + 3 \times b_2 \times \left(\frac{r}{R}\right) * \left(1 - \frac{r}{R}\right)^2 + 3 \times b_3 \times \left(\frac{r}{R}\right)^2 \times \left(1 - \frac{r}{R}\right) + b_4 \times \left(\frac{r}{R}\right)^3$$

wherein r is a distance from the hub cylinder axis to the point and R is the propeller blade radius. Preferably, $a_1$ is a constant greater than 8 and less than 30, $a_2$ is a constant greater than 15 and less than 60, $a_3$ is a constant greater than 15 and less than 60, $a_4$ is a constant greater than 5 and less than 25, $b_1$ is a constant greater than 40 and less than 70, $b_2$ is a constant greater than 30 and less than 60, $b_3$ is a constant greater than 15 and less than 40, and $b_4$ is a constant greater than 30 and less than 70 (e.g., as shown in FIGS. 12A-12B).

Figure 10B:
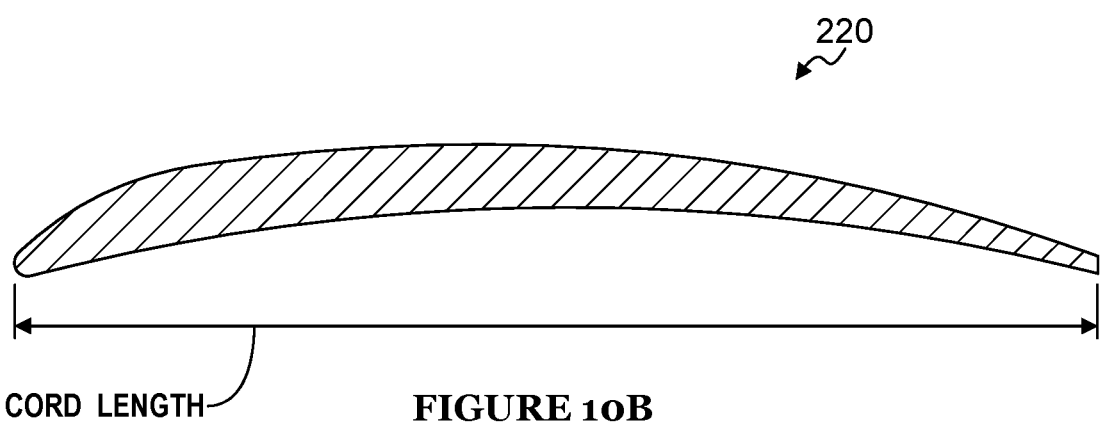
FIG. 10B is a cross-sectional view of a propeller blade of the fourth example.

In a first variation of this embodiment, the propeller diameter (e.g., twice the distance from the hub axis 211 to a propeller blade tip) can be 40-200 mm and a widest chord length can be 10-60 mm, preferably located 30%-50% of the distance along the length of the blade 220 (e.g., measured from the axis of rotation). In one example of this variation, the propeller diameter is between 60 mm and 120 mm and the widest chord length is between 10 mm and 60 mm. The point on the leading edge that is used to define the chord can be defined as the surface point of minimum radius, the surface point that will yield maximum chord length, or any other suitable point. The blades 220 preferably define airfoils with large camber, small thickness, high lift coefficient, and high lift-to-drag ratio under low Reynolds number condition (e.g., as shown in FIG. 10B). The blades 220 can include sweep features (e.g., within the range of 75%-95% of the length of the blade from the hub axis 211), preferably with the magnitude of sweep smaller than 5% of the blade radius (e.g., 2.5% of the propeller diameter).

The propeller 200 is preferably of unitary construction. Alternatively, the blades 220 can be inserted in to the hub 210 (e.g., retained within the hub by friction), otherwise fastened or affixed to the hub (e.g., by mechanical fasteners, by adhesive, etc.), and/or coupled to the hub in any other suitable manner. The propeller 200 can additionally or alternatively include any other suitable elements in any suitable arrangement.

3.3 Mating Mechanisms.

The mating mechanisms can function to couple the propeller 200 to the rotor 120 and to align and/or retain the propeller 200 with respect to the rotor 120. The aerial system 1 preferably includes one or more mating mechanisms, and each of the mating mechanisms can preferably retain and/or align the propeller 200 and rotor 120 along one or more directions. The directions can include an axial translation direction (e.g., directed substantially along the rotor axis 123 and/or hub axis 211), a yaw direction (e.g., rotation about the axial translation direction), radial translation directions (e.g., directed perpendicular to the axial translation direction), radial rotation directions (e.g., rotations about axes perpendicular to the axial translation direction), and/or any other suitable directions. Each mating mechanism preferably includes complementary elements on (e.g., of unitary construction with, affixed to, etc.) each of the rotor 120 and hub 210, but can alternatively include only elements on one of the rotor 120 and hub 210, elements separate from both the rotor and hub, and/or elements in any other suitable arrangement.

3.3.1 Axial Retention Mechanism.

The axial retention mechanism 310 functions to retain the hub 210 at the rotor 120 in the axial translation direction, and can optionally retain the hub in one or more other directions. The axial retention mechanism 310 can fix the relative positions of the hub and rotor along the axis (e.g., rotor axis, hub axis), can limit the hub and rotor to a range of relative positions (e.g., wherein the hub and rotor are free to translate with respect to each other within the range but are restricted from exiting the range), or axially retain the hub and rotor in any other suitable manner. The axial retention mechanism 310 preferably retains the rotor within the void of the hub (e.g., as described above), but can additionally or alternatively retain the hub within a void of the rotor, or retain the hub and rotor in any other suitable arrangement.

The axial retention mechanism 310 is preferably configured to engage (thereby retaining the hub and rotor axially) in response to application of an insertion force (e.g., inward axial force) above a threshold value (e.g., 5 N, 8 N, 10 N, 12 N, 15 N, 20 N, 25 N, 30 N, 15-20 N, etc.). The axial retention mechanism 310 is preferably configured to disengage (thereby no longer retaining the hub and rotor axially) in response to application of a removal force (e.g., outward axial force) above a threshold value (e.g., 10 N, 15 N, 20 N, 25 N, 30 N, 35 N, 40 N, 25-35 N, etc.). However, the axial retention mechanism 310 can operate using any suitable insertion and/or removal force thresholds, and/or engage in response to application of any other suitable force applied in any other suitable manner (e.g., torque).

The axial retention mechanism 310 preferably includes a first and second axial retention element (or a first and second set of axial retention elements). One of the first and second axial retention elements is preferably on the hub, and the other is preferably on the rotor. The first and second axial retention elements are preferably complementary (e.g., wherein they cooperatively retain the hub and rotor axially). For example, the first and second axial retention elements can be configured to fit together (e.g., abut, interdigitate, one retained within the other, etc.). However, the first and second axial retention elements can be non-complementary or otherwise configured.

The axial retention mechanism 310 preferably includes a snap-fit retention mechanism, but can additionally or alternatively include a latch mechanism, friction fit mount, interference fit, bayonet mount, threaded mount, magnetic mechanism, and/or any other suitable retention mechanism. The snap-fit retention mechanism preferably includes a protrusion 311 (e.g., as the first axial retention element) and a complementary recess 312 (e.g., as the second axial retention element), and can additionally or alternatively include any other suitable elements.

The protrusion 311 is preferably fixed to one of the hub or the rotor (captive element), but can alternatively be fixed to the stator or to any other suitable component. The protrusion 311 defines a protrusion depth 317 (e.g., protrusion height) by which it protrudes from the captive element. The recess 312 is preferably fixed to the other of the hub or the rotor (i.e. capturing element; the element to which the protrusion is not fixed). The recess 312 is preferably complementary to the protrusion 311 (e.g., configured to fit around the protrusion). When the axial retention mechanism 310 is engaged, the protrusion 311 is preferably retained within the recess 312, and when the axial retention mechanism 310 is not engaged, the protrusion 311 is preferably not within the recess 312.

The capturing element preferably includes additional elements arranged near the recess 312 such that the protrusion 311 interacts with one or more of the additional elements during engagement and/or disengagement. The additional elements can include a retention flange 313 (e.g., flange including a wall of the recess), which can define a retention angle 316 (e.g., between an axis such as the hub axis 211 and a tangent plane, such as a plane tangent to the wall at a point at which the protrusion 311 contacts it during retention and/or removal). The additional elements can include a lead-in surface 314 (e.g., a second wall of the retention flange, opposing the wall shared by the retention flange and the recess), which can define an insertion angle 315 (e.g., between an axis such as the hub axis 211 and a tangent plane of the lead-in surface 314, such as a plane tangent to the lead-in surface 314 at a point at which the protrusion 311 contacts it during insertion). The insertion angle 315 can be 10°, 20°, 25°, 30°, 35°, 40°, 50°, 60°, 25°-35°, 20°-40°, 10°-50°, less than 10°, greater than 50°, or any other suitable angle. The retention angle 316 can be 10°, 20°, 30°, 35°, 40°, 45°, 50°, 55°, 60°, 65°, 70°, 80°, 90°, 40°-50°, 35°-55°, 30°-60°, less than 30°, greater than 60°, or any other suitable angle. During insertion and/or removal, the rotor strain and/or hub strain is preferably less than a threshold value (e.g., 5%, 4%, 3%, 2.5%, 2%, 1.5%, etc.), and the friction coefficient between the axial retention mechanism elements is preferably within a target range (e.g., 0.45-0.55, 0.4-0.6, 0.3-0.7, 0.1-1.0, etc.). The axial retention mechanism 310 (and/or any other suitable element of the system) can additionally or alternatively include one or more strain-relief elements 318 (e.g., notches, flexible members, etc.). The strain-relief elements 318 can function to reduce the mechanical strain needed during mating and/or unmating, can allow regions of an element to strain (e.g., during mating and/or unmating) while other (e.g., adjacent) regions remain unstrained or less strained, and/or can function in any other suitable manner.

In a first example, the rotor is the outer element and the hub is the inner element. In this example, a cylindrical segment of the hub fits within a cylindrical void of the rotor, the hub includes an annular protrusion, and the rotor includes a complementary recess, retention flange, and lead-in surface.

Figure 5A:
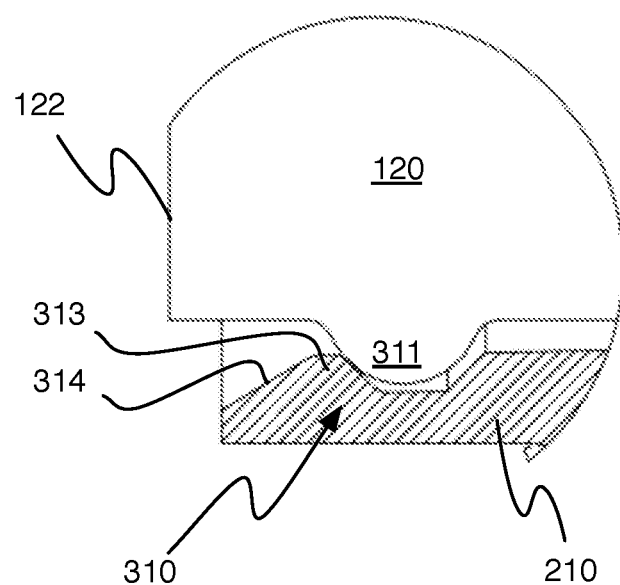
FIG. 5A is a detailed view of region I in FIG. 4A.
Figure 5B:
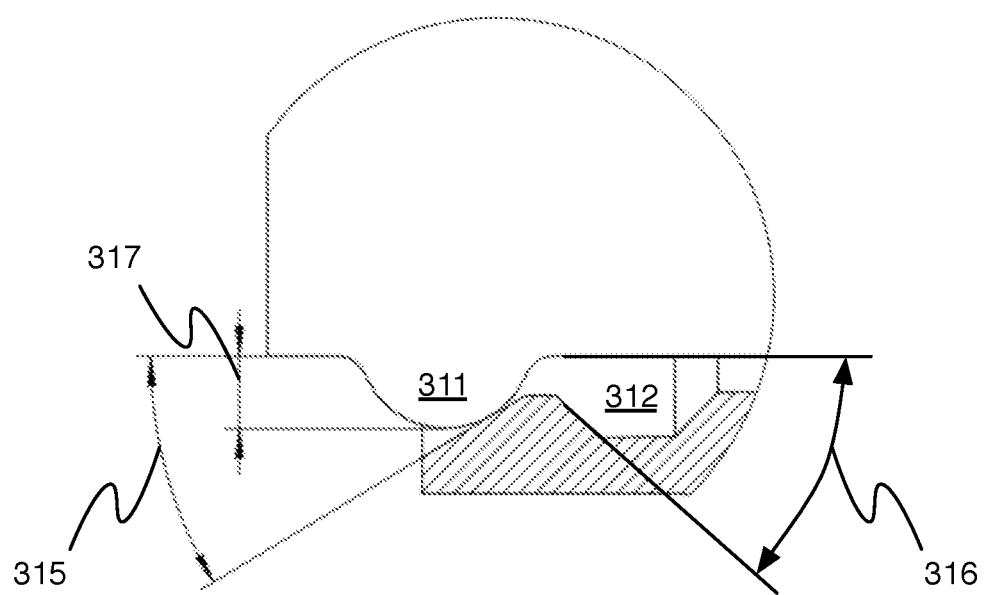
FIG. 5B is a detailed view of an axial retention mechanism of the first example, transitioning between the unmated and mated configurations.

In a second example (e.g., as shown in FIGS. 5A-5B), the rotor is the inner element and includes a cylindrical segment that fits within a cylindrical void of the hub, which is the outer element. The rotor includes an annular (e.g., circumferential) protrusion 311, preferably defining a curved profile but additionally or alternatively defining an angular profile and/or other suitable profile. The hub defines a complementary (e.g., annular, circumferential) recess 312. The recess 312 is preferably arranged near an open end of the hub (e.g., wherein, when the hub and rotor are in the mated configuration, the rotor second end 122 is near the open end of the hub). The retention flange 313 (e.g., annular retention flange, circumferential retention flange, retention flange following substantially the same path as the recess 312, etc.) is preferably arranged between the open end and the recess 312 (e.g., in the mated configuration, arranged between the second end 122 and the recess 312). The retention flange 313 can define an inner diameter equal to, less than, or greater than the hub inner diameter 212. The lead-in surface 314 is preferably arranged between the open end and the retention flange 313 (e.g., in the mated configuration, arranged between the second end 122 and the retention flange 313). The lead-in surface 314 can be defined by a chamfer, bevel, round, and/or any other suitable feature.

Figure 16:
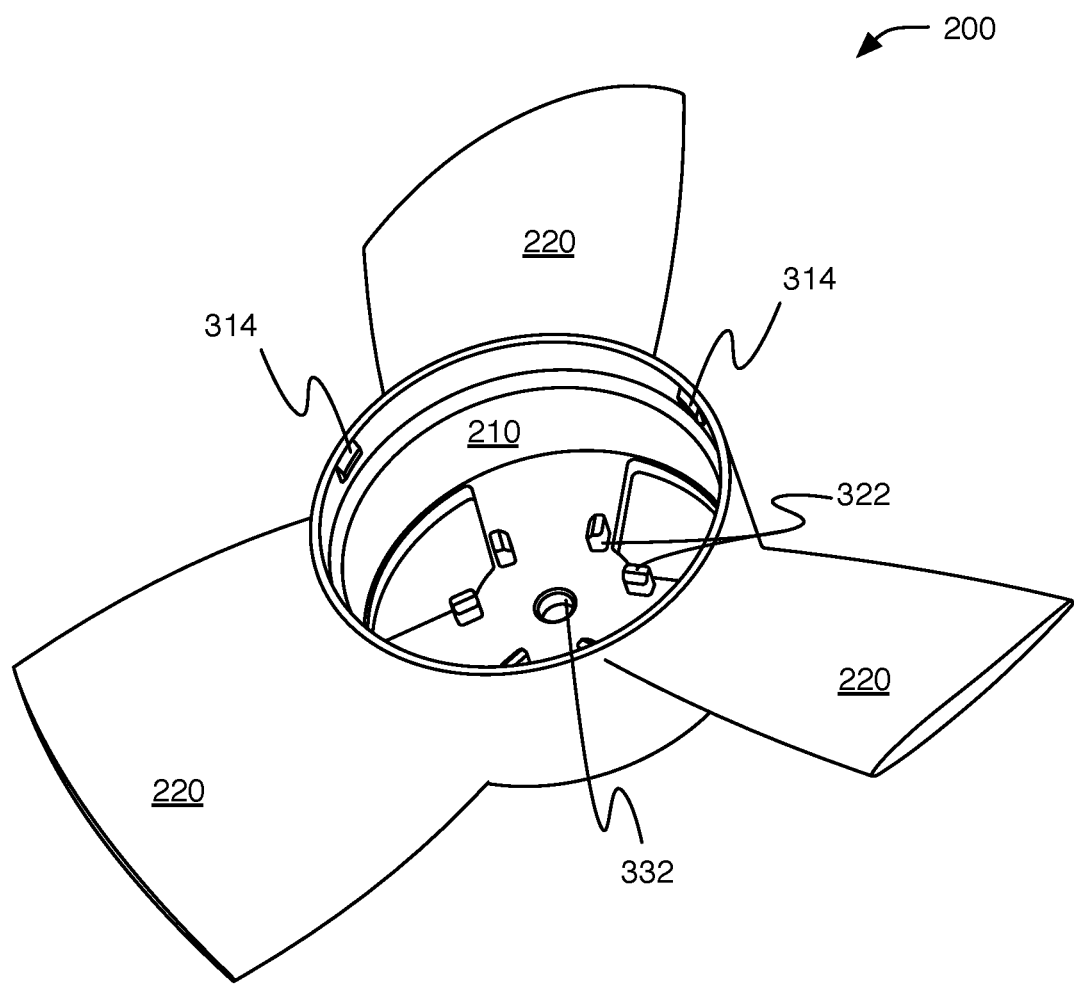
FIG. 16 is a perspective view of a first specific example of the propeller of the second example.
Figure 17:
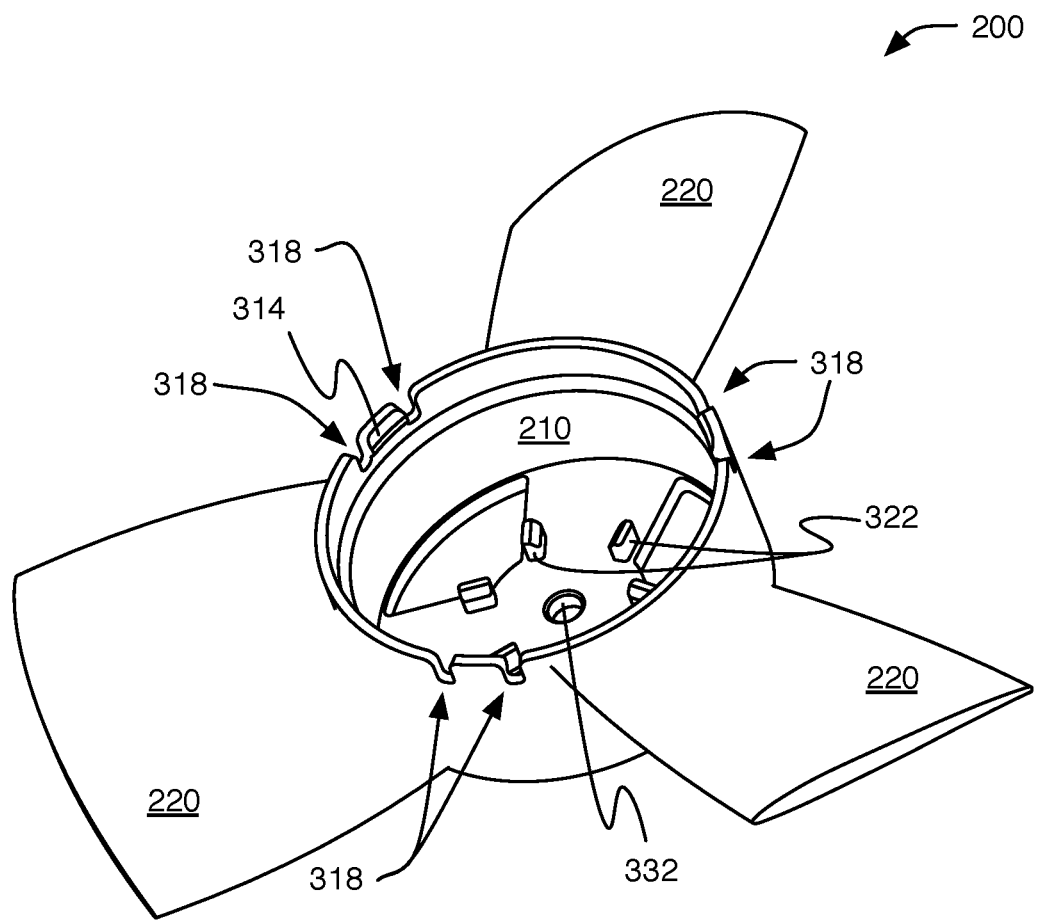
FIG. 17 is a perspective view of a second specific example of the propeller of the second example.
Figure 18A:
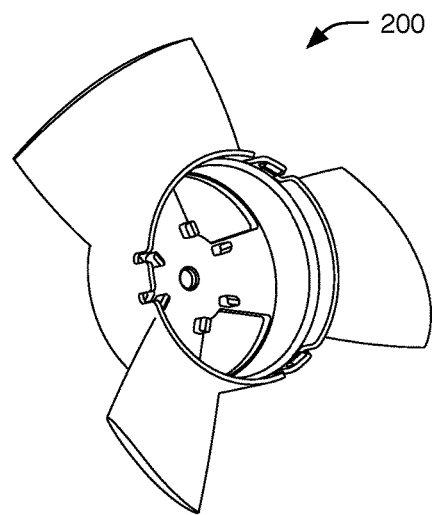
FIGS. 18A-18C are perspective views of the second specific example of the propeller.
Figure 18B:
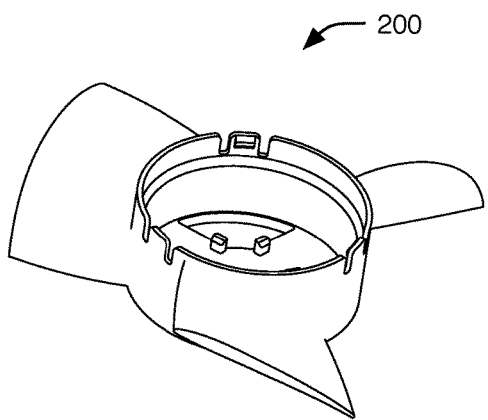
Figure 18C:
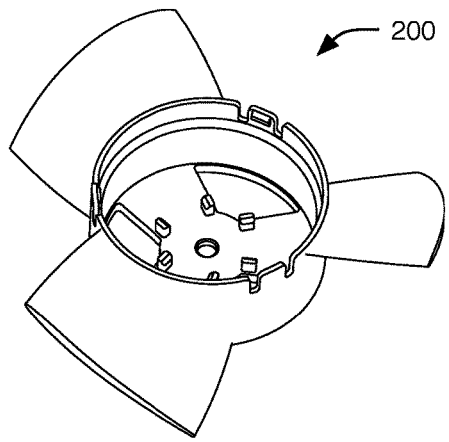

The elements of the axial retention mechanism (e.g., in the first and second examples) can be defined along the entire cylinder circumference, defined along portions of the circumference, and/or defined along any other suitable paths and/or in any other suitable regions. The complementary elements (e.g., protrusion 311, recess 312, retention flange 313, lead-in surface 314, etc.) can be defined in substantially the same regions and/or in different regions (e.g., one element defined in only a subset of the regions of another element, elements having both overlapping and non-overlapping regions, etc.). The regions of definition along the circumference can be unequally or equally distributed (e.g., a number of regions, such as 2, 3, 4, 5, 6, or 7 or more regions, regularly or irregularly spaced around the circumference), can be of equal or unequal sizes (e.g., each covering an angular segment such as 5°, 10°, 15°, 20°, 30°, 40°, 2-10°, 10-20°, 2°-4°, etc.) and can be in a common or different plane (e.g., have offset locations along the hub axis). For example, the protrusion 311 can be defined along the entire circumference, and the retention flange 313 and lead-in surface 314 can be defined only in a subset of the circumference (e.g., as shown in FIG. 16). The axial retention mechanism can optionally include strain-relief elements 318. Examples of strain-relief elements 318 that can be used include: notches, springs, strain conversion mechanisms (e.g., that convert the strain to heat), interleaved flexible material, and/or any other suitable strain-relief element. In a specific example (e.g., as shown in FIGS. 17 and 18A-18C), a subset of regions of the propeller 200 and/or motor 100 (e.g., the regions in which all elements of the axial retention mechanism 310 are defined) can include strain-relief elements 318 (e.g., notches), which can allow the subset of regions to strain (e.g., during mating and/or unmating) while reducing the strain in other regions.

However, the axial retention mechanism 310 can additionally or alternatively include any other suitable elements in any other suitable arrangement.

3.3.2 Rotational Retention Mechanism.

The rotational retention mechanism 320 functions to retain the hub 210 at the rotor 120 in the yaw direction, and can optionally retain the hub in one or more other directions. The rotational retention mechanism 320 can fix the relative positions of the hub and rotor about the axis, can limit the hub and rotor to a range of relative positions (e.g., wherein the hub and rotor are free to rotate with respect to each other within the range but are restricted from exiting the range), or retain the hub and rotor about the axis in any other suitable manner.

The rotational retention mechanism 320 preferably includes a first and second rotational retention element or a first and second set of rotational retention elements. The elements of the first and second sets can have a one-to-one relationship, a many-to-one relationship (e.g., the first set can include two elements for each element of the second set, one element of the first set arranged on each of two opposing sides of each element of the second set), or any other suitable relationship. One of the first and second rotational retention elements is preferably on the hub, and the other is preferably on the rotor. The first and second rotational retention elements are preferably complementary (e.g., wherein they cooperatively retain the hub and rotor in the yaw direction). For example, the first and second rotational retention elements can be configured to fit together (e.g., abut, interdigitate, one retained within the other, etc.). However, the rotational retention elements can be otherwise arranged and configured. The first and second rotational retention elements can contact at a surface defining a normal vector, preferably wherein the inner product of the normal vector and a rotation tangent vector (e.g., tangent to the yaw direction at a point radially aligned with the contact surface) is substantially non-zero, more preferably wherein the normal and tangent vectors are substantially parallel (e.g., defining an angle less than a threshold angle, such as 1°, 3°, 10°, etc.).

In a first variation, the rotational retention mechanism 320 includes at least one radial member 321 fixed to one of the hub or rotor, and at least one limit member 322 (e.g., member extending substantially parallel the rotor axis 123 and/or hub axis 211) fixed to the other of the hub or rotor. The limit member 322 can be configured to contact the radial member 321 (e.g., thereby preventing rotation of the radial member past the limit member). The radial members can radiate inward and/or outward (e.g., from a body or void, such as a cylindrical body or void; from a central member; from an axial retention element, etc.).

Figure 7B:
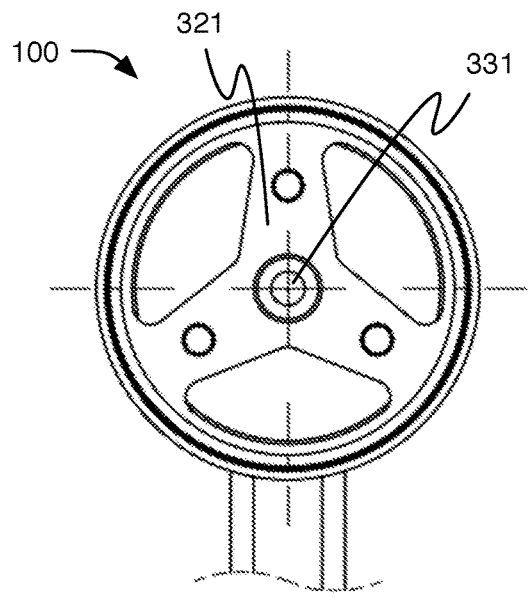
FIG. 7B is a plan view of the motor and a portion of the mating mechanisms of the first example.
Figure 7C:
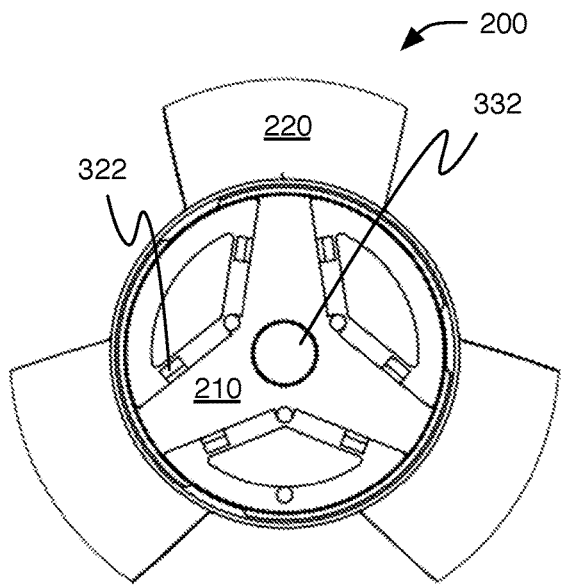
FIG. 7C is a plan view of the propeller and a portion of the mating mechanisms of the first example.

In a first example of this variation, the rotor 120 includes a plurality of ribs (radial members 321) extending radially inward from the rotor cylinder, preferably meeting at or near the rotor axis 123, and the hub 210 includes a plurality of limit members 322 (e.g., extending upward and/or downward from one or more radial ribs of the hub) arranged on both sides of each radial member 321 (e.g., as shown in FIGS. 7B-7C). In a specific example, the rotor and hub each include three radial ribs arranged with equal angular spacing about the rotor and hub axes, respectively, and the hub includes six limit members (two for each radial rib of the rotor).

In a second example, the hub includes protrusions (e.g., bosses, pins, dowels, etc.), preferably protruding substantially parallel the hub axis 211 but alternatively at any suitable angle to the hub axis 211, that align with complementary holes defined in the rotor (e.g., in the rotor cylinder, in one or more radial members of the rotor, etc.).

In a third example, the annular recess and protrusion of the axial retention mechanism 310 vary along their length (e.g., based on angular position). In a specific example, the recess and protrusion are only defined in some angular sections, and are absent from others (e.g., do not extend around the entire circumference of the cylindrical bodies). However, the rotational retention mechanism 320 can additionally or alternatively include any other suitable elements arranged in any other suitable manner.

3.3.3 Radial Alignment Mechanism.

The radial alignment mechanism 330 can function to retain the hub 210 at the rotor 120 in the radial translation and rotation directions, and can optionally retain the hub in one or more other directions. The radial alignment mechanism 330 preferably fixes the relative positions of the hub and rotor in the radial translation and rotation directions, but can alternatively limit the hub and rotor to a range of relative positions (e.g., wherein the hub and rotor are free to move in the radial translation and/or rotation directions with respect to each other within the range but are restricted from exiting the range) or retain the hub and rotor about the axis in any other suitable manner. The radial alignment mechanism 330 preferably establishes and/or maintains a substantially coaxial alignment of the rotor axis 123 and hub axis 211 (e.g., establishing and/or maintaining parallelism and/or concentricity of cylindrical bodies defined by the rotor 120 and hub 210), but can additionally or alternatively establish and/or maintain any other suitable alignments.

The radial alignment mechanism 330 preferably includes a first and second radial alignment element (or a first and second set of radial alignment elements). One of the first and second radial alignment elements is preferably on the hub, and the other is preferably on the rotor. The first and second radial alignment elements are preferably complementary. For example, the first and second radial alignment elements can be configured to fit together (e.g., abut, interdigitate, one retained within the other, etc.). However, a radial alignment mechanism pair can be otherwise configured. The system can include one or more radial alignment mechanism pairs, which can be evenly arcuately and/or radially distributed or otherwise configured.

Figure 6:
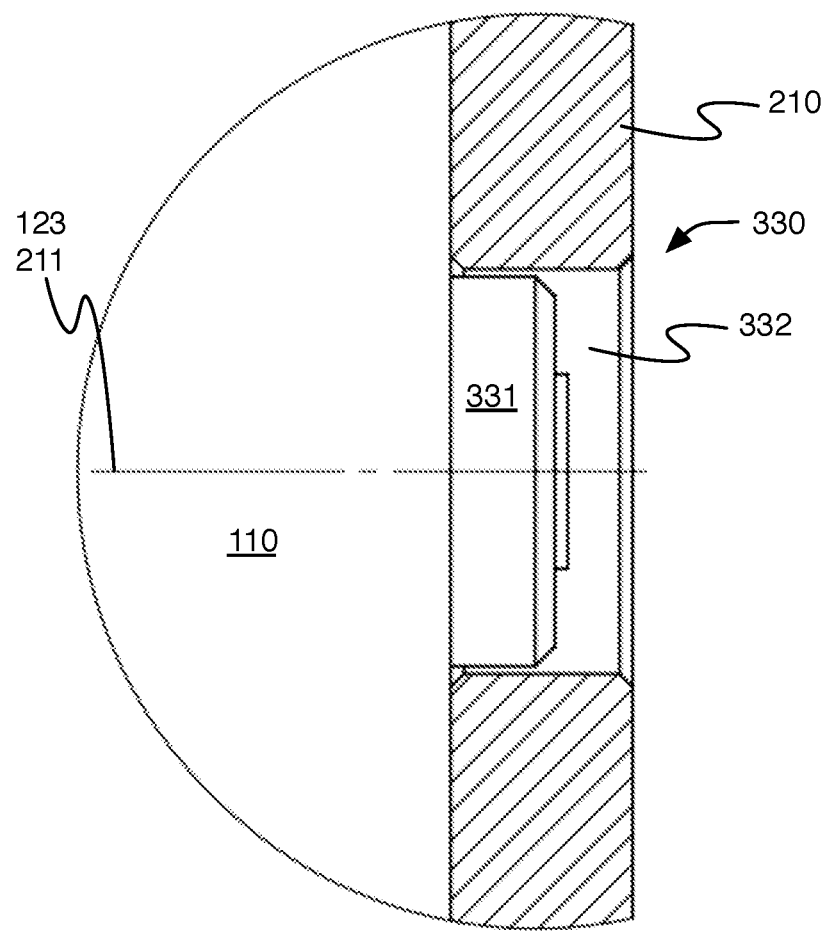
FIG. 6 is a detailed view of region II in FIG. 4A.

In a first variation, an axial protrusion 331 (e.g., boss, dowel, pin, shaft, etc.) on one of the hub or rotor is configured to fit into a hole 332 (e.g., pocket, through-hole, etc.) in the other of the hub or rotor (e.g., as shown in FIG. 6). The axial protrusion 331 is preferably on the rotor and the hole 332 is preferably in the hub, but alternatively the axial protrusion 331 can be on the hub and the hole 332 can be in the rotor. The axial protrusion 331 and hole 332 are preferably circular and centered on the rotor axis 123 and/or hub axis 211. Alternatively, the axial protrusion 331 and/or hole 332 can be non-circular, the radial alignment mechanism 330 can include more than one axial protrusion 331 and/or hole 332, and/or the axial protrusion(s) 331 and hole(s) 332 can be arranged off-axis (e.g., with a rotationally symmetric or asymmetric distribution), which can enable the axial protrusion 331 and hole 332 to additionally function as a rotational retention mechanism 320. The axial protrusion 331 and hole 332 preferably have a clearance fit, but can alternatively have an interference fit, a snap fit, and/or any other suitable fit. The axial protrusion 331 and/or hole 332 can include features (e.g., chamfers, fillets, rounds, etc.) to help guide them into alignment (e.g., during mating of the hub and rotor). In a specific example, the hole 332 is defined in a central segment of the hub 210 and a boss (axial protrusion 331) is defined at the center of the rotor, each defined where a plurality of radial ribs (e.g., of the rotational retention mechanism 320) meet. The interior surface of the hole and/or exterior surface of the boss can optionally define chamfers, rounds, and/or any other suitable lead-in features. In a second variation, one of the hub or rotor includes a pair of axial protrusions (e.g., fins) and the other of the hub or rotor includes a rib (e.g., radial rib), wherein the axial protrusions are separated by a distance substantially equal to or slightly larger than the rib width. However, the radial alignment mechanism 330 can include any other suitable elements in any other suitable arrangement.

3.3.4 Damping Mechanism.

The damping mechanism 340 can function to reduce vibration transmission between the hub and rotor, and can optionally retain the hub and rotor with respect to each other (e.g., function as one or more of the retention and/or alignment mechanisms). The damping mechanism 340 can be arranged between the hub and rotor, preferably compressed between them (e.g., having an interference fit). The damping mechanism 340 is preferably affixed to and/or embedded in (e.g., glued to, retained within a groove of, etc.) one of the hub or rotor, but can alternatively be retained only by the interference fit and/or retained in any other suitable manner.

The damping mechanism 340 preferably includes (e.g., is made of) one or more flexible materials (e.g., rubber, silicone, etc.), but can additionally or alternatively include rigid materials and/or any other suitable materials. The damping mechanism 340 can define shapes such as dots, lines, and/or pads. The damping mechanism 340 can include one or more damping elements. The elements can be arranged circumferentially (e.g., around an entire circumference, around a portion of a circumference), axially (e.g., parallel the rotor axis 123 and/or hub axis 211), diagonally, and/or in any other suitable directions.

Figure 9A:
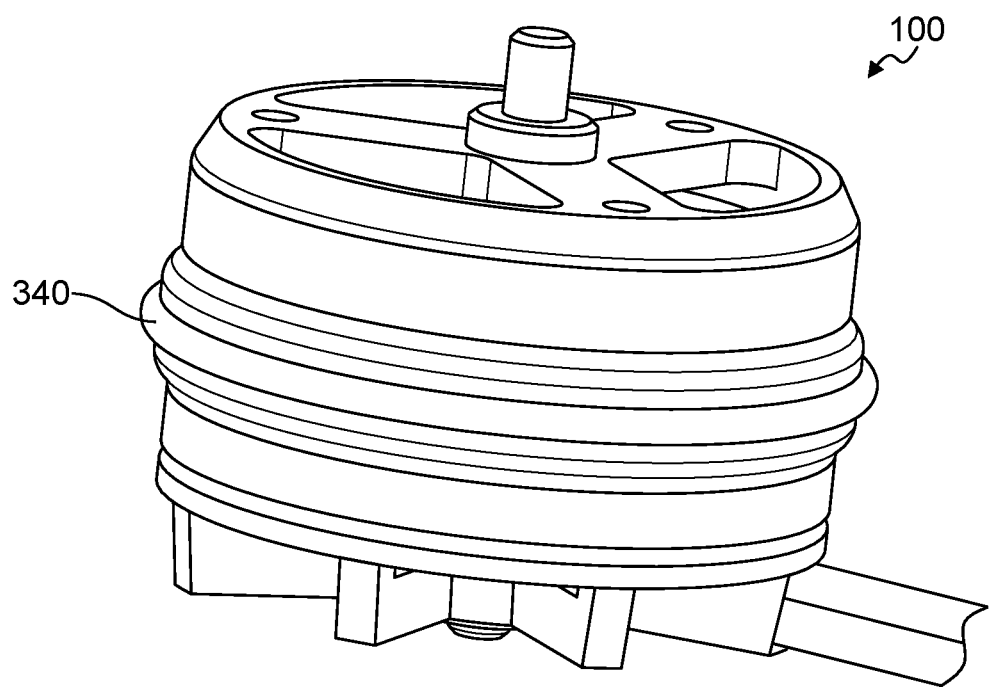
FIG. 9A is a perspective view of a portion of a third example of the propulsion assembly.
Figure 9B:
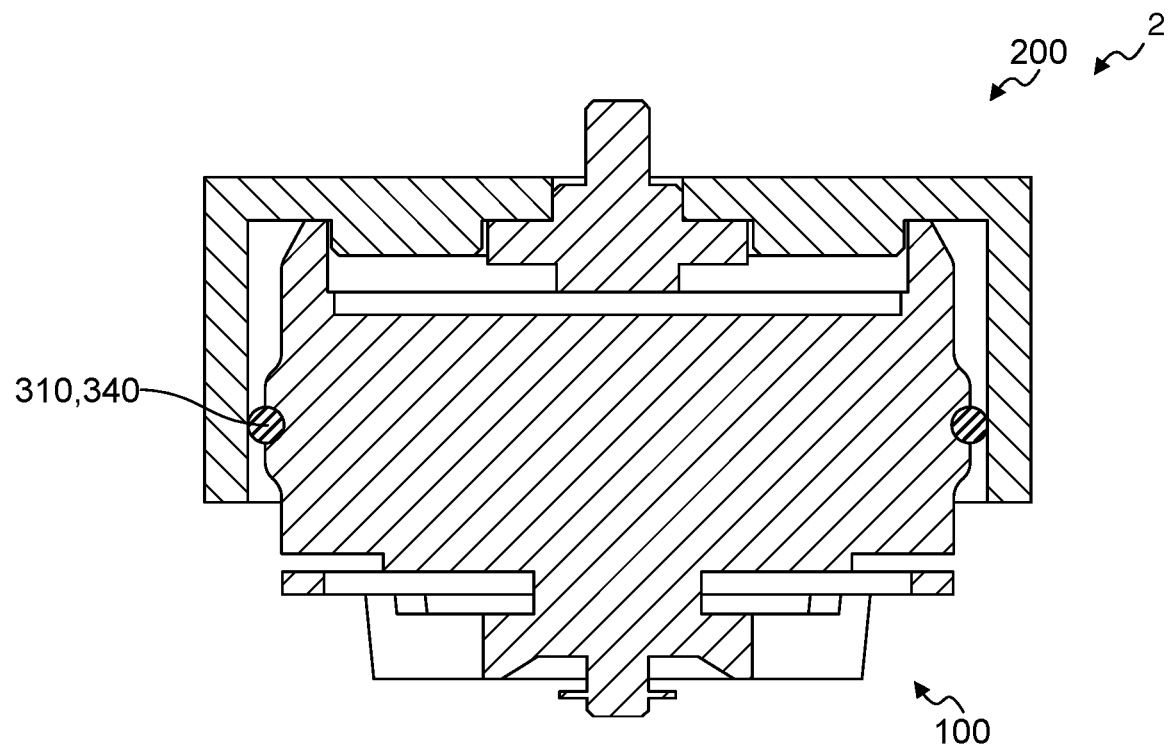
FIG. 9B is a cross-sectional view of the third example, in a mated configuration.

In a first example, the damping mechanism 340 includes an O-ring retained in a groove of the inner element (e.g., as shown in FIGS. 9A-9B). The O-ring can be arranged axially above or below the axial retention mechanism interface. Additionally or alternatively, the O-ring can optionally function as an axial retention mechanism 310 and/or rotational retention mechanism 320. In a second example, the damping mechanism 340 includes a plurality of axial ribs with equal angular spacing around the outside of the inner element and/or the inside of the outer element. However, the damping mechanism 340 can additionally or alternatively include any other suitable elements in any other suitable arrangement.

3.3.5 Additional Elements.

Figure 8A:
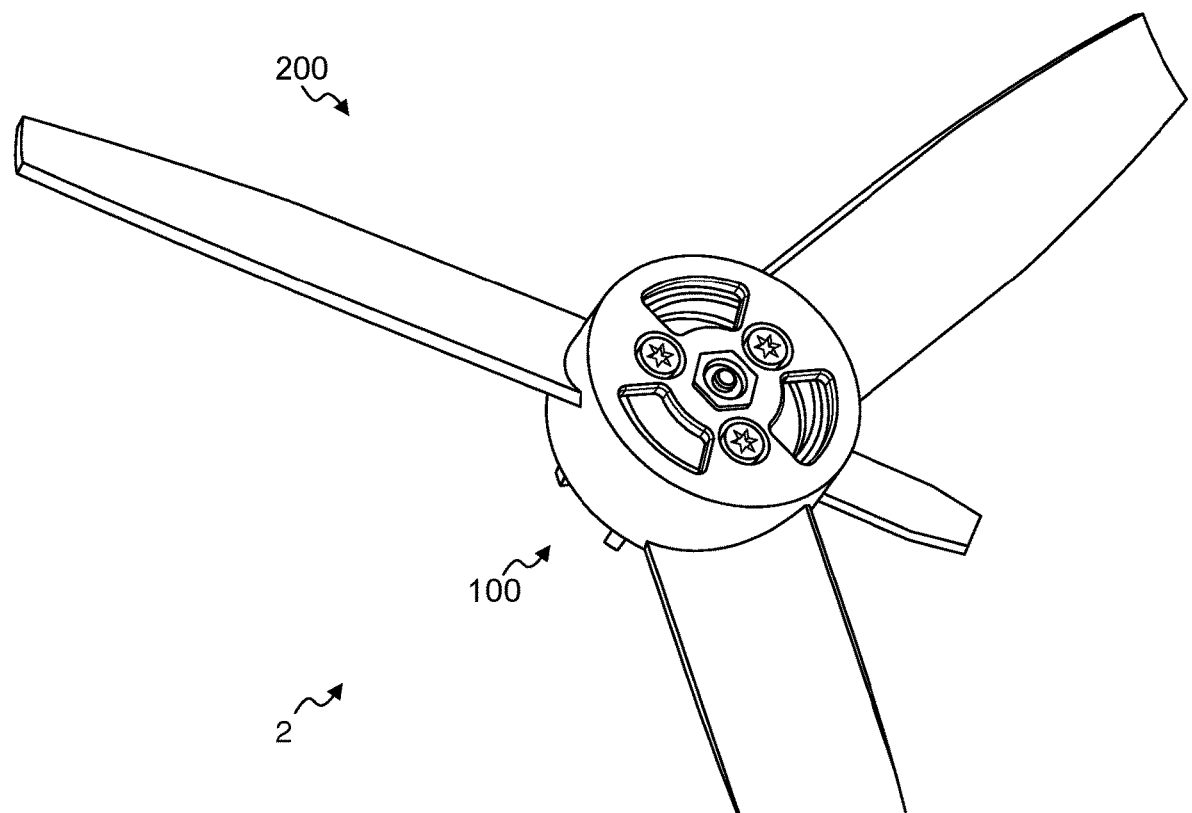
FIG. 8A is a perspective view of a second example of the propulsion assembly, in a mated configuration.
Figure 8B:
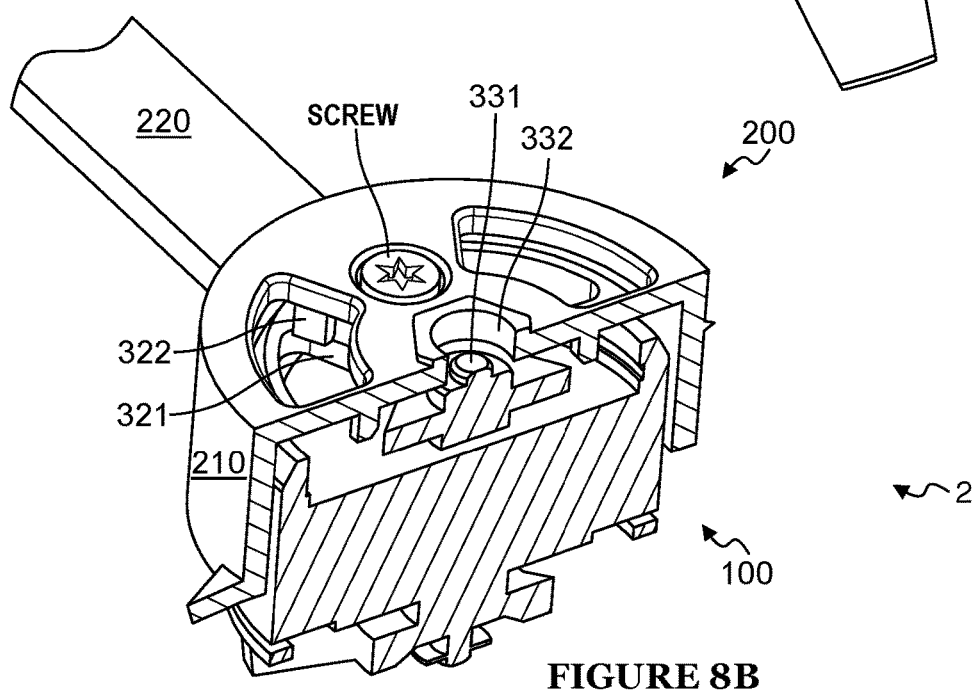
FIG. 8B is a cross-sectional perspective view of the second example, transitioning between the unmated and mated configurations.

The mating mechanisms can additionally or alternatively include fasteners (e.g., screws, latches, etc.). For example, the mating mechanisms can include self-locking low cap screws, threaded holes, and counterbored through-holes (e.g., as shown in FIGS. 8A-8B), which can function as secure and/or low-profile fasteners.

The mating mechanisms can additionally or alternatively include one or more grip-enhancing elements. The grip-enhancing elements can function to allow and/or facilitate manual gripping of the motor 100 and/or propeller 200 (e.g., to mate or unmate the hub 210 from the rotor 120). In a first variant, the propeller blades 220 can function as grip-enhancing elements. In a second variant, the grip-enhancing elements can include grooves defined in an outer surface of the hub. However, the mating mechanisms can additionally or alternatively include any other suitable elements in any other suitable arrangement.

4. Method.

Figure 13:
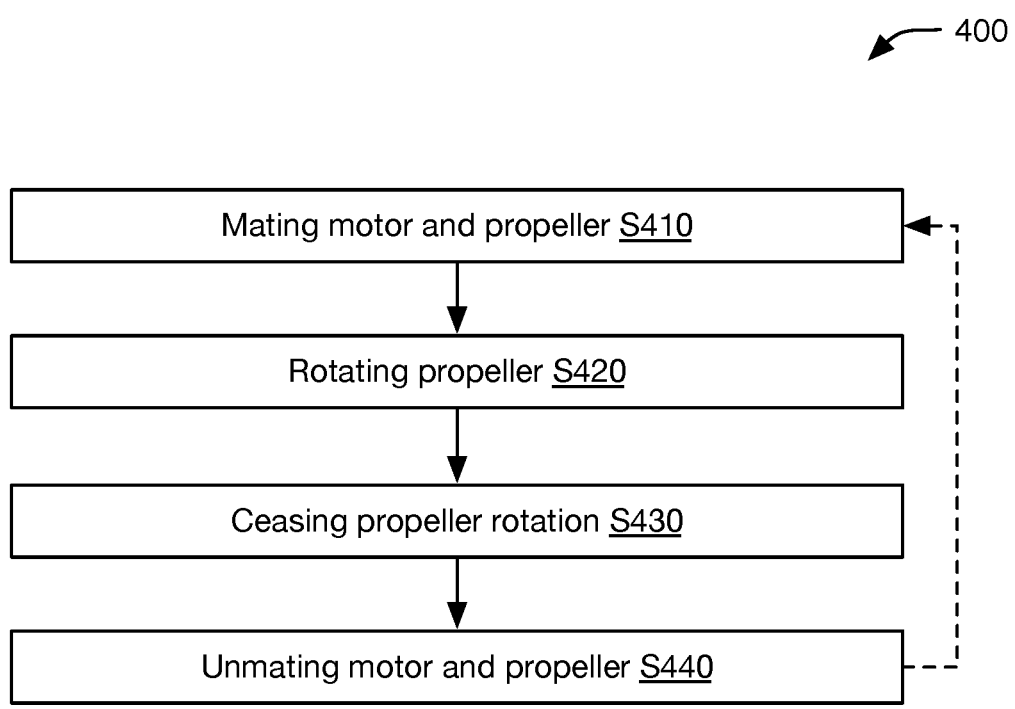
FIG. 13 is a schematic representation of the method.

A method 400 for aerial system use can include mating a motor and propeller S410, rotating the propeller S420, ceasing propeller rotation S430, and/or unmating the motor and propeller S440 (e.g., as shown in FIG. 13). The method 400 is preferably performed using the aerial system 1 and/or propulsion assembly 2 described above, but can additionally or alternatively be performed using any other suitable aerial system.

Mating the motor and propeller S410 can include establishing alignments between the rotor and hub (e.g., approximate alignments, precise alignments, etc.), which can include coaxial alignment (e.g., in the radial translation and/or rotation directions) and/or rotational alignment (e.g., in the yaw direction), and applying inward axial force (e.g., greater than an insertion force threshold). Elements of the system (e.g., mating mechanisms) can guide the mating of the hub to the rotor (e.g., guiding from approximate alignment into more precise alignment) and subsequently maintain the desired arrangement.

A specific example of mating the motor and propeller S410 includes: establishing approximate coaxial alignment between the propeller and the rotor (e.g., manually, such as by holding the propeller in one hand and the motor or aerial system housing in the other hand); establishing approximate yaw alignment between the propeller hub and the rotor (e.g., aligning the radial ribs of the hub and rotor), so that the chamfering of the limit members will cause the rotor ribs to align more precisely during mating; and pressing the propeller toward the rotor along the axial direction. In this specific example, if the propeller and the motor are not approximately aligned, the propeller hub cylinder will contact the top surface of the motor housing so that the propeller hub cannot be pressed into the mating configuration. In this specific example, when axial pressure is applied, the annular protrusion passes over the retention flange and the inner surface of the hub contacts the top surface of the motor housing. During this process, an audible sound is preferably emitted, which can indicate that the installation is complete. However, the motor and propeller can be otherwise mated.

Figure 14:
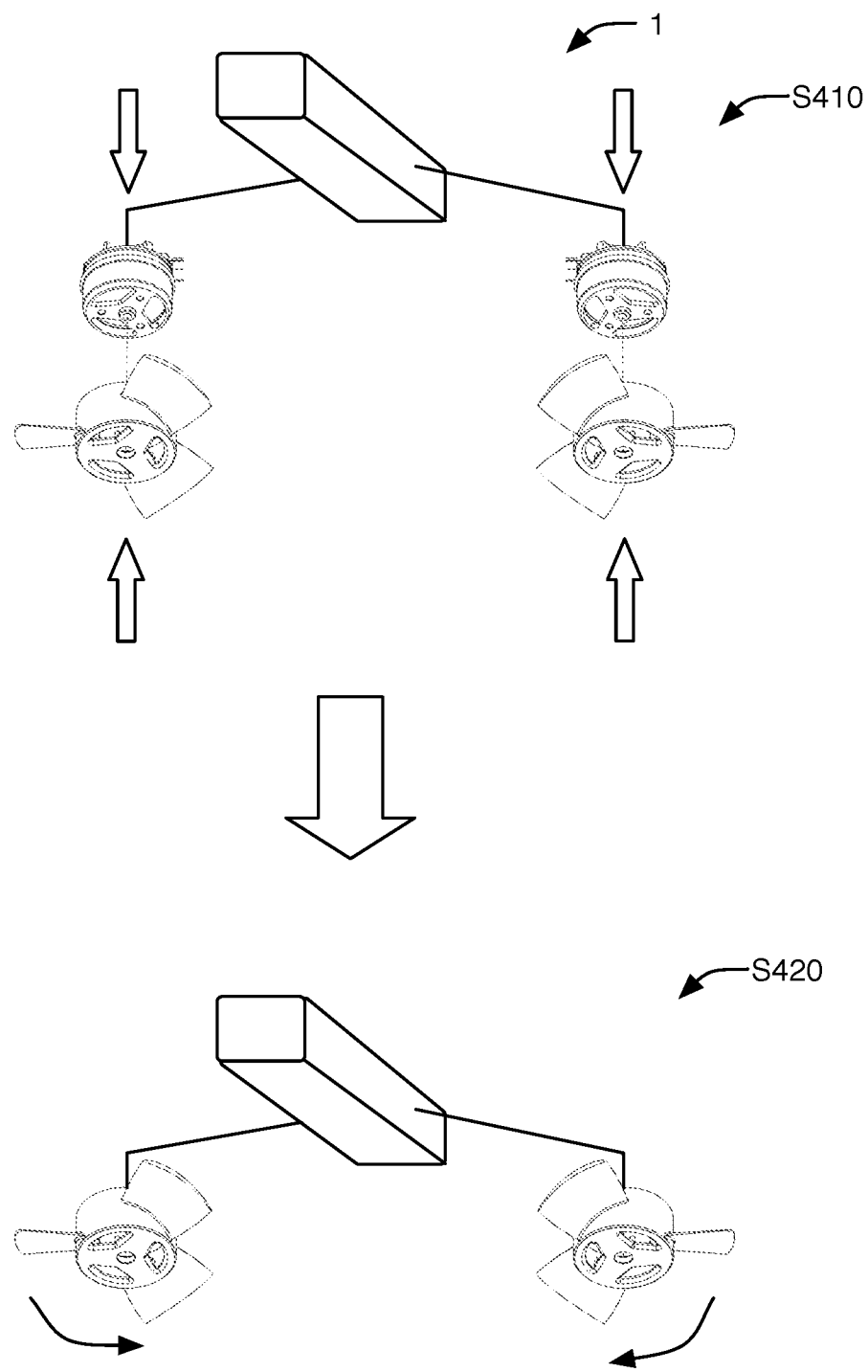
FIG. 14 is a schematic representation of a specific example of the method.

Rotating the propeller S420 is preferably performed by the motor, and can function to propel the aerial system and/or to control aerial system flight. Rotation of the rotor preferably causes the propeller to rotate (e.g., due to the rotational retention mechanism). During propeller rotation, the force generated by the propeller (e.g., reaction force caused by air displaced by the propeller) preferably retains the propeller against the hub axially (e.g., the force is directed substantially along the axis in the inward or mating direction). In a specific example, in which the propeller is mounted to the rotor from below, when the propeller is driven by the motor, the propeller generates a propulsion force, so that the inner surface of the propeller hub and the top surface of the motor housing are retained against each other (e.g., as shown in FIG. 14).

Ceasing propeller rotation S430 can function to cease aerial system flight. Ceasing propeller rotation S430 is preferably performed by the motor (e.g., by ceasing motor rotation, by ceasing powered motor rotation, etc.).

Unmating the motor and propeller S440 preferably includes applying outward axial force (e.g., greater than a removal force threshold), more preferably by holding the propeller (e.g., by a grip-enhancing element) in one hand, retaining the motor or aerial system housing (e.g., in a second hand, in a stand, pressed against a surface, etc.), and pulling the propeller away from the motor in the outward axial direction. In a specific example, S440 includes orienting the aerial system so that the propeller is above the motor, gently holding the propeller blades between the fingers of a hand, and pulling upward to unmate the propeller. S440 can be performed to remove a damaged propeller (e.g., for subsequent replacement by a functional propeller), to remove a first type of propeller (e.g., for subsequent replacement by a second type of propeller), and/or for any other suitable purpose. However, the method 400 can include any other suitable elements performed in any other suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. An aerial vehicle comprising:
   a housing;
   an outrunner motor comprising a stator mechanically coupled to the housing and a rotor rotationally coupled to the stator about a rotor axis, the rotor comprising:
      a body centered around and extending parallel the rotor axis;
      an outward protrusion from the body, the outward protrusion mechanically connected to the body and defined along an outer perimeter of a cross-section of the body, the cross-section normal the rotor axis;
      a radial member mechanically connected to the body and extending radially inward from the body; and
      a boss mechanically coupled to the body by the radial member, the boss centered around and extending parallel the rotor axis; and
   a propeller removably coupled to the rotor, the propeller comprising a hub and a plurality of propeller blades mechanically coupled to the hub, the propeller defining a central propeller axis, the hub comprising:
      an inner surface arranged around the body and defining a recess retaining the outward protrusion within the recess;
      a limit member contacting the radial member and rotationally retaining the propeller about the rotor axis with respect to the rotor; and
      a surface defining a hole centered around the central propeller axis, the boss arranged within the hole and retaining the central propeller axis substantially collinear with the rotor axis.

2. The aerial vehicle of claim 1, wherein the hub is mounted below the rotor.

3. The aerial vehicle of claim 1, wherein the body comprises a substantially cylindrical body segment.

4. The aerial vehicle of claim 1, further comprising a set of radial members comprising the radial member, each radial member of the set mechanically connected to the body and to the boss.

5. The aerial vehicle of claim 1, wherein the plurality of propeller blades define a regular angular spacing around the central propeller axis.

\* \* \* \* \*